US007072656B2

(12) United States Patent
Willars et al.

(10) Patent No.: US 7,072,656 B2
(45) Date of Patent: Jul. 4, 2006

(54) HANDOVER IN A SHARED RADIO ACCESS NETWORK ENVIRONMENT USING SUBSCRIBER-DEPENDENT NEIGHBOR CELL LISTS

(75) Inventors: Per Willars, Stockholm (SE); Bengt Persson, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 392 days.

(21) Appl. No.: 10/068,012

(22) Filed: Feb. 8, 2002

(65) Prior Publication Data

US 2003/0013443 A1 Jan. 16, 2003

Related U.S. Application Data

(63) Continuation-in-part of application No. 09/268,471, filed on Apr. 6, 1999, now abandoned.

(60) Provisional application No. 60/268,065, filed on Feb. 13, 2001, provisional application No. 60/301,442, filed on Jun. 29, 2001.

(51) Int. Cl.
*H04Q 7/20* (2006.01)

(52) U.S. Cl. ............... 455/436; 455/432.1; 370/331

(58) Field of Classification Search ............... 455/436, 455/437, 438, 439, 503, 560, 445, 432, 432.1–2, 455/443, 444, 446, 453, 456.1; 370/331, 370/332
See application file for complete search history.

(56) References Cited

U.S. PATENT DOCUMENTS

| 5,276,907 | A | 1/1994 | Meidan |
| 5,345,467 | A | 9/1994 | Lomp et al. |
| 5,418,838 | A * | 5/1995 | Havermans et al. ........ 455/465 |
| 5,425,029 | A | 6/1995 | Hluchyj et al. |
| 5,640,414 | A | 6/1997 | Blakeney, II et al. |
| 5,771,275 | A | 6/1998 | Brunner et al. |

(Continued)

FOREIGN PATENT DOCUMENTS

EP 0 888 026 A2 12/1998

(Continued)

OTHER PUBLICATIONS

U.S. Appl. No. 60/282,486, filed Apr. 10, 2001 entitled "Commanding Handover Between Differing Radio Access Technologies".

(Continued)

*Primary Examiner*—CongVan Tran
(74) *Attorney, Agent, or Firm*—Nixon & Vanderhye, P.C.

(57) ABSTRACT

In a radio access network (14) comprising a serving radio network control node ($26_1$) and a drift radio network control node ($26_2$), a determination is first made that a target cell controlled by the drift radio network control node should be prepared for handover with respect to a user equipment unit (30). The target cell is neighbored by a set of neighboring cells, the set of neighboring cells including a first subset of neighboring cells and a second subset of neighboring cells, a handover involving the user equipment unit being permitted for a cell of the first subset but not for a cell of the second subset. In accordance with the determination, a message including a filtered list of cells is sent to the user equipment unit, the filtered list of cells including the first subset but not the second subset. The filtered list of cells can comprise, for example, a list of cells for whose frequencies the user equipment unit is to perform measurements. Which nodes perform the actions of (1) determining an allowed area(s) for the user equipment unit; and (2) preparing the filtered list of cells using the allowed area(s) depends on which of various alternative implementations are utilized.

65 Claims, 16 Drawing Sheets

U.S. PATENT DOCUMENTS

| | | | |
|---|---|---|---|
| 5,845,203 A | | 12/1998 | LaDue |
| 5,862,480 A | | 1/1999 | Wild et al. |
| 5,870,427 A | | 2/1999 | Tiedemann, Jr. et al. |
| 5,873,036 A | | 2/1999 | Vucetic |
| 5,903,832 A | | 5/1999 | Seppanen et al. |
| 5,920,818 A | | 7/1999 | Frodigh et al. |
| 5,999,811 A | | 12/1999 | Mölne |
| 6,038,449 A | * | 3/2000 | Corriveau et al. .......... 455/439 |
| 6,081,515 A | * | 6/2000 | Toivola ...................... 370/339 |
| 6,128,490 A | | 10/2000 | Shaheen et al. |
| 6,178,164 B1 | * | 1/2001 | Wang et al. ................. 370/331 |
| 6,192,244 B1 | * | 2/2001 | Abbadessa .................. 455/436 |
| 6,295,450 B1 | * | 9/2001 | Lyer et al. .................. 455/436 |
| 6,487,409 B1 | * | 11/2002 | Qing-An ..................... 455/436 |
| 6,529,490 B1 | * | 3/2003 | Oh et al. .................... 370/331 |
| 6,574,473 B1 | * | 6/2003 | Rinne et al. ................ 455/436 |
| 2002/0151304 A1 | * | 10/2002 | Hogan ........................ 455/436 |

FOREIGN PATENT DOCUMENTS

| | | |
|---|---|---|
| GB | 2 315 193 A | 1/1998 |
| WO | 95/15665 | 6/1995 |
| WO | 98/06226 | 2/1998 |
| WO | 99/67902 | 12/1999 |
| WO | 00/44189 A1 | 7/2000 |

OTHER PUBLICATIONS

ITU-T Recommendation Q.2630.1, Series Q: Switching and Signalling, Broadband ISDN—Common Aspects of B-ISDN Application Protocols for Access Signalling and Network Signalling and Interworking, AAL Type 2 Signalling Protocol—Capability Set 1, Dec. 1999.

3GPP TS 25,304, V3.9.0 (Dec. 2001); 3rd Generation Partnership Project; Tech. Spec. Group Radio Access Network; UE Procedures in Idle Mode and Procedures for Cell Reselection in Connected Mode (Release 1999).

3GPP TS 24.008, V10.0 (Dec. 2001), 3rd Generation Partnership Project; Tech. Spec. Group Core Network; Mobile Radio Interface Layer 3 Specification; Core Network Protocols—Stage 3 (Release 1999).

3GPP TS 25.331, V3.6.0 (Mar. 2001), 3rd Generation Partnership Project; Tech. Spec. Group Radio Access Network; RRC Protocol Specification (Release 1999).

U.S. Appl. No. 09/286,471, filed Apr. 6, 1999 entitled "INTER-SYSTEM HANDOVER—GENERIC HANDOVER MECHANISM".

Antipolis, S., "UE-UTRAN Radio Interface Protocol Architecture; Stage 2;" European Telecommunications Standards Institute, UMTS YY.01, V1.0.0, Dec. 1998, pp. 1-39.

Antipolis, S., UMTS Terrestrial Radio Access Network (UTRAN); UTRA FDD; (UMTS XX.03 V1.3.1), European Telecommunications Standards Institute, Feb. 1999, pp. 1-23.

U.S. Appl. No. 10/068,000, filed Feb. 8, 2002, entitled "Partial Support of Mobility Between Radio Access Networks".

U.S. Appl. No. 09/932,447, filed Aug. 20, 2001 entitled "Shared Network Support Over the 3GPP IUR Interface".

U.S. Appl. No. 10/068,001, filed Feb. 8, 2002, entitled "Coordinated Subscriber Access Handling for Shared Network Support".

U.S. Appl. No. 09/852,915, filed May 11, 2001 entitled "Releasing Plural Radio Connections with Omnibus Release Message".

International Preliminary Examination Report mailed Apr. 28, 2003 in corresponding PCT Application No. PCT/SE02/00249.

* cited by examiner

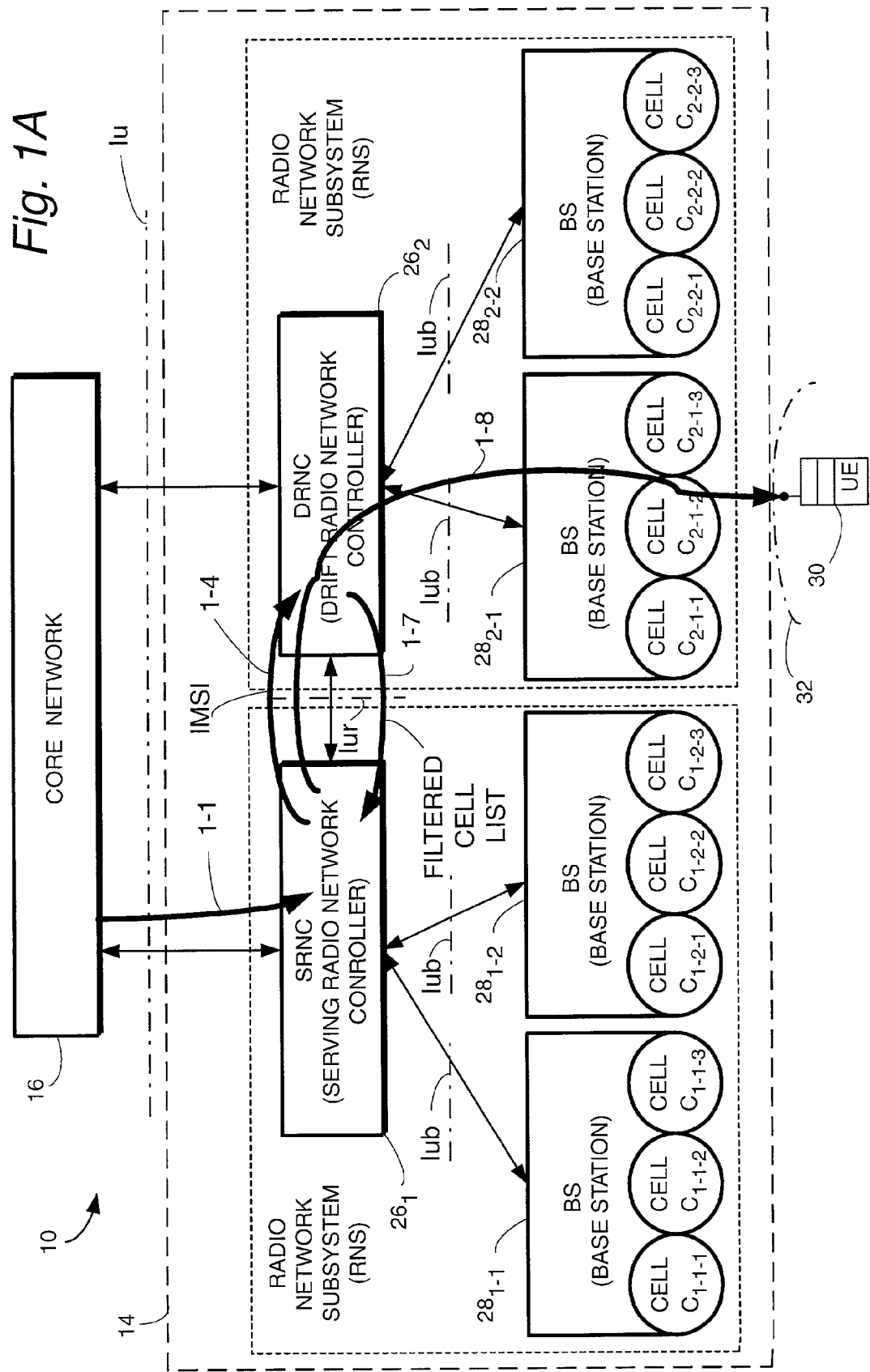

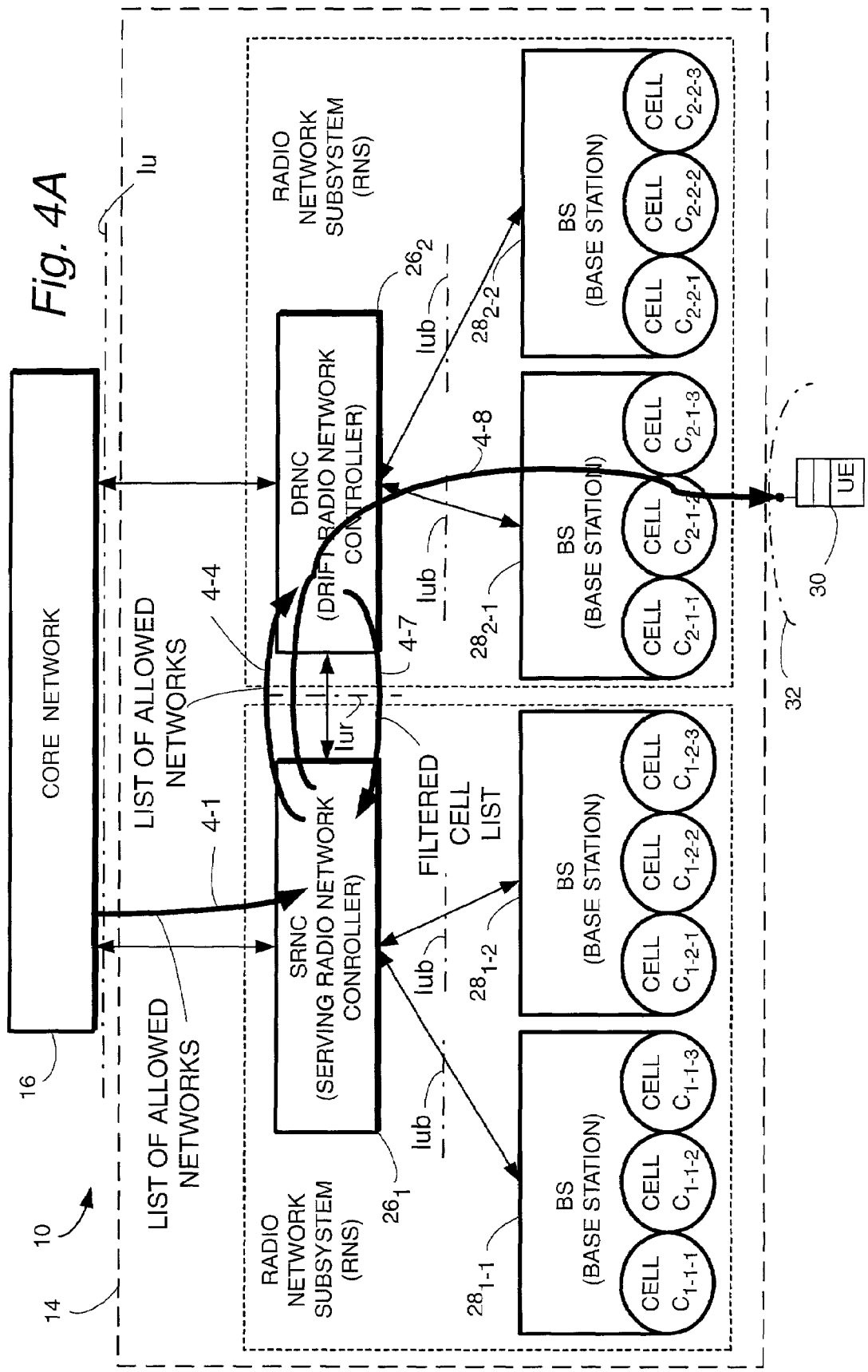

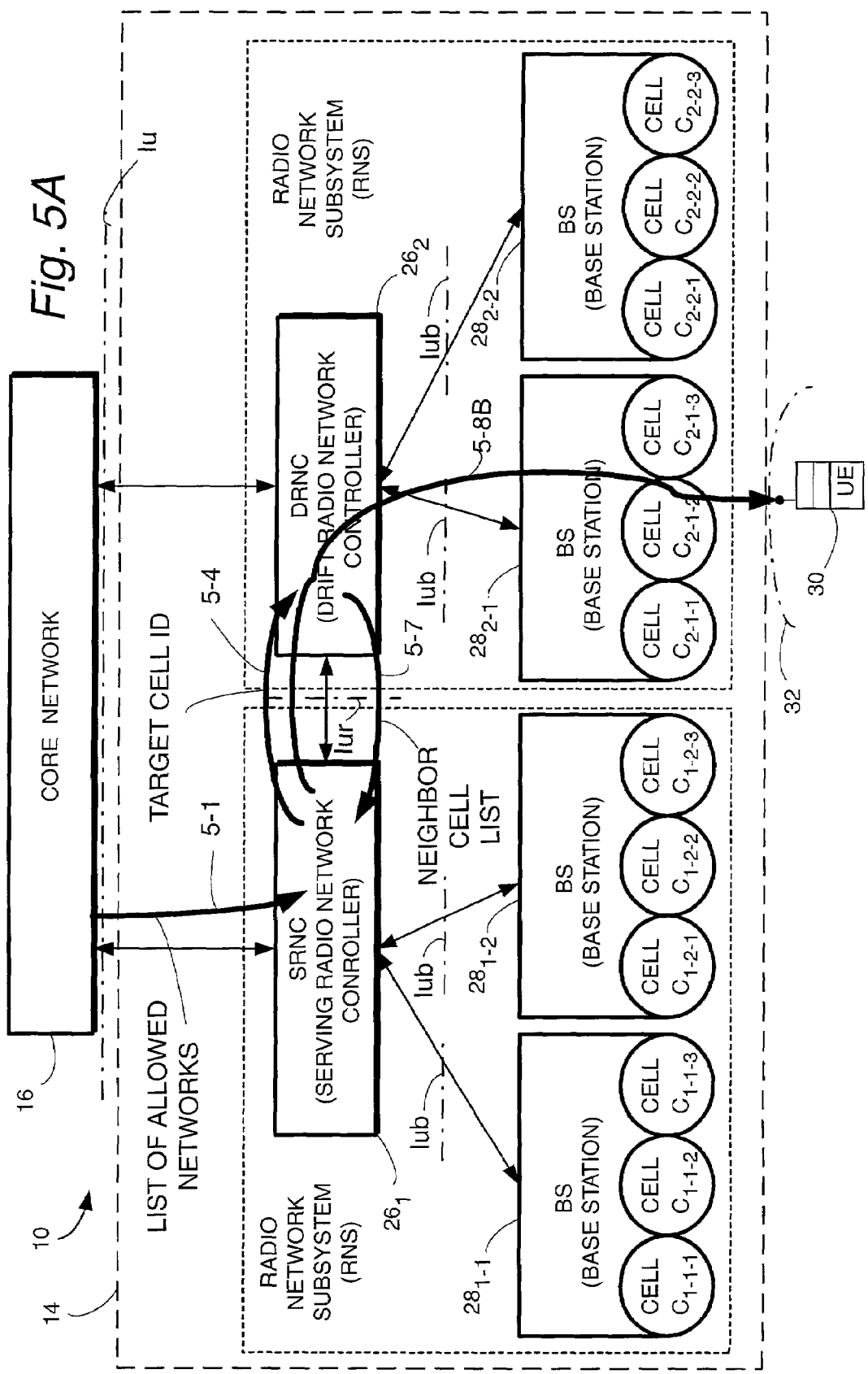

HANDOVER IN A SHARED RADIO ACCESS NETWORK ENVIRONMENT USING SUBSCRIBER-DEPENDENT NEIGHBOR CELL LISTS

This application is a continuation-in-Part of U.S. patent application Ser. No. 09/268,471, Filed Apr. 6, 1999, entitled "Inter-System Handover—Generic Handaver Mechanism", which is now abandoned. This application further claims the benefit and priority of the following (all of which are incorporated herein by reference in their entirety): U.S. Provisional Patent Application No. 60/268,065, filed Feb. 13, 2001, entitled "Handover In A Shared Radio Access Network Environment Using Subscriber Dependent Neighbor Cell Lists"; U.S. Provisional Patent Application No. 60/301,442, filed Jun. 29, 2001, entitled "Partial Support of Mobility Between Radio Access Networks". This application is related to the following (all of which are incorporated herein by reference in their entirety); U.S. patent application Ser. No. 09/932,447, filed Aug. 20, 2001, entitled "Transmission of Filtering/Filtered Information Over the Iur Interface"; U.S. Provisional Patent Application No. 60/330,708, filed Oct. 29,2001, entitled "Coordinated Subscriber Access Handling For Shared Network Support"; U.S. patent application Ser. No. 10/068,000, filed Feb. 13, 2002, entitled "Partial Support of Mobility Between Radio Access Networks"; and, U.S. patent application Ser. No. 10/068,001, filed Feb. 13, 2002, entitled "Coordinated Subscriber Access Handling For Shared Network Support".

BACKGROUND

1. Field of the Invention

The present invention relates to radio communications, and in particular, to handover in a shared radio access network environment.

2. Related Art and Other Considerations

In a typical cellular radio system, mobile user equipment units (UEs) communicate via a radio access network (RAN) to one or more core networks. The User Equipment (UE) is the mobile terminal by which a subscriber can access services offered by the operator's Core Network (CN). The RAN (Radio Access Network) is the part of the network that is responsible for the radio transmission and control of the radio connection. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

FIG. 7 and the explanation below introduce the assumed network architecture and context for describing example embodiments of the present invention. The RNS (Radio Network Subsystem) controls a number of Base Stations in the radio access network. The RNC (Radio Network Controller) controls radio resources and radio connectivity within a set of cells. The radio access network (RAN) covers a geographical area which is divided into cell areas, with each cell area being served by a base station (BS). A cell is a geographical area where radio coverage is provided by the radio base station equipment at a base station site. Each cell is identified by a unique identity, which is broadcast in the cell.

The base stations communicate over the air interface (e.g., radio frequencies) with the user equipment units (UE) within range of the base stations. In the radio access network, several base stations are typically connected (e.g., by landlines or microwave) to a radio network controller (RNC). In FIG. 7, each base station is shown with three representative cells. The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

The Universal Mobile Telecommunications (UMTS) Terrestrial Radio Access Network (UTRAN) accommodates both circuit switched and packet switched connections. In this regard, in UTRAN the circuit switched connections involve a radio network controller (RNC) communicating with a mobile switching center (MSC), which in turn is connected to a connection-oriented, external core network, which may be (for example) the Public Switched Telephone Network (PSTN) and/or the Integrated Services Digital Network (ISDN). On the other hand, in UTRAN the packet switched connections involve the radio network controller communicating with a Serving GPRS Support Node (SGSN) which in turn is connected through a backbone network and a Gateway GPRS support node (GGSN) to packet-switched networks (e.g., the Internet, X.25 external networks). MSCs and GSNs are in contact with a Home Location Register (HRL), which is a database of subscriber information.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". In some instances, a connection involves both a Serving or Source RNC (SRNC) and a target or drift RNC (DRNC), with the SRNC controlling the connection but with one or more diversity legs of the connection being handling by the DRNC. An Inter-RNC transport link can be utilized for the transport of control and data signals between Source RNC and a Drift or Target RNC, and can be either a direct link or a logical link. An interface between radio network controllers (e.g., between a Serving RNC [SRNC] and a Drift RNC [DRNC]) is termed the "Iur" interface.

The radio network controller (RNC) controls the UTRAN. In fulfilling its control role, the RNC manages resources of the UTRAN. Such resources managed by the RNC include (among others) the downlink (DL) power transmitted by the base stations; the uplink (UL) interference perceived by the base stations; and the hardware situated at the base stations.

Those skilled in the art appreciate that, with respect to a certain RAN-UE connection, an RNC can either have the role of a serving RNC (SRNC) or the role of a drift RNC (DRNC). If an RNC is a serving RNC (SRNC), the RNC is in charge of the connection with the user equipment unit (UE), e.g., it has full control of the connection within the radio access network (RAN). A serving RNC (SRNC) is connected to the core network. On the other hand, if an RNC is a drift RNC (DRNC), its supports the serving RNC (SRNC) by supplying radio resources (within the cells controlled by the drift RNC (DRNC)) needed for a connection with the user equipment unit (UE). A system which includes the drift radio network controller (DRNC) and the base stations controlled over the Iub Interface by the drift radio network controller (DRNC) is herein referenced as a DRNC subsystem or DRNS. An RNC is said to be the Controlling RNC (CRNC) for the base stations connected to it by an Iub interface. This CRNC role is not UE specific. The CRNC is, among other things, responsible for handling radio resource management for the cells in the base stations connected to it by the Iub interface.

The UTRAN interfaces (Iu, Iur and Iub) have two planes, namely, a control plane (CP) and a user plane (UP). In order to control the UTRAN, the radio network application in the different nodes communicate by using the control plane protocols. The RANAP is a control plane protocol for the Iu interface; the RNSAP is a control plane protocol for the Iur interface; and NBAP is a control plane protocol for the Iub interface. The control plane protocols are transported over reliable signaling bearers. The transport of data received/transmitted on the radio interface occurs in the user plane (UP). In the user plane, the data is transported over unreliable transport bearers. The serving radio network controller (SRNC) is responsible for establishing the necessary transport bearers between the serving radio network controller (SRNC) and the drift radio network controller (DRNC).

The RAN decides the role of an RNC (SRNC or DRNC) when the UE-RAN connection is being established. Normally, the RNC that controls the cell where the connection to the UE is initially established is assigned the SRNC role for that UE connection. As the UE moves, the connection is maintained by establishing radio communication branches via new cells, possibly also involving cells controlled by other RNCs (i.e., DRNCs).

In FIG. 8, RNC $26_1$ acts as SRNC for the connections to the single UE shown. In FIG. 9, RNC $26_1$ acts as SRNC for the connections to the UE. The connection to UE is, after successive handovers, now communicated via a cell controlled by RNC $26_2$, thus acting as DRNC for this connection. In FIG. 8 and FIG. 9, for the purpose of illustrating the RNC roles, only the SRNC has an interface to the CN. It should be understood that all RNCs have a CN interface.

For each mobile that the SRNC is serving, the SRNC stores a bit string which permanently identifies the mobile. According to the RAN system specified by 3GPP, this bit string is the IMSI, and is transferred to the SRNC from the CN using a Common ID procedure over the Iu interface at connection establishment. The "IMSI" is the international mobile subscriber identity (IMSI); "PLMN" refers to the public land mobile network (PLMN). The international mobile subscriber identity (IMSI) [which comprises not more than fifteen digits] comprises three components: a mobile country code (MCC)[three digits]; a mobile network code (MNC)[two or three digits]; and a mobile subscriber identification number (MSIN). The home-public land mobile network (HPLMN) id [HPLMNid] of the user equipment unit can be extracted from the international mobile subscriber identity (IMSI). In this regard, the HPLMNid of the user equipment unit is the mobile country code (MCC)+ the mobile network code (MNC).

In the 3GPP approach, the structure of the IMSI is not recognized or used by the SRNC. It is only used to coordinate a paging from one CN domain with a connection that is ongoing for the other CN domain (matching two bit strings).

The DRNC stores cell information for all cells it controls and all neighboring cells. When a mobile is using a dedicated radio channel (3gpp cell_DCH state), the UTRAN transmits to the mobile a list of channels for which the mobile is to measure the signal strength of a transmission received on each of those channels associated with neighboring cells. The channel to measure for a neighboring WCDMA cell is identified both by frequency and code. The mobile measures the signal strengths of transmissions received from each of these neighbor cells, and reports the strongest ones, which become candidates for handover. All of the neighbor cell information is transferred from the DRNC to the SRNC when the SRNC sets up a radio link in a certain cell belonging to the DRNC.

In this situation, a problem will occur (as described below) if two or more network operators share part of a radio network in a certain area, but also have their own individual radio networks to serve mobiles leaving the coverage of the shared network. Consider these two example scenarios:

The shared network may be deployed in one region of the country, whereas in the rest of the country, the operators have their own networks.

The shared network covers the whole country with a certain radio access technology (e.g., WCDMA), whereas each operator has its own network of another radio access technology (e.g., GSM).

In a special case, the shared network can be identical to one of the individual networks. In general, the shared network as well as the individual networks could support any of one or more radio access technologies, (e.g., 2G and/or 3G).

The problem and the solution(s) in accordance with the present invention are described in the following, non-limiting, example context:

Two operators A and B, each having an individual network (of any radio access technology)
the shared network is a WCDMA network.

In a shared network, subscribers of either operator A and B, or of any operator that has a roaming agreement with any of the operators A and B, can use the same shared network.

A problem occurs when that subscriber is leaving the coverage of the shared network requiring a handover to one of the two individual networks of operator A or B. A subscriber of operator A should normally be handed over to operator A's individual network, and similarly for operator B's subscribers. However, in the 3GPP approach, cells of both the individual network A and B need to be defined as neighbor cells to a certain shared network cell. The mobile is informed about all these cells and measures signal strengths from all of them. When reporting cell measurements to the RAN, the mobile may report as a candidate for handover a cell that belongs to the "wrong" network. In other words, when the mobile leaves the shared network area and enters into operator A's network, it may still report as a candidate, a cell in operator B's network. This degrades performance and may lead to lost calls.

What is needed, therefore, and an object of the present invention, is a technique to provide the mobile a list of neighbor cells adapted to that specific mobile's subscription.

BRIEF SUMMARY

In a radio access network comprising a serving radio network control node and a drift radio network control node, a determination is first made that a target cell controlled by the drift radio network control node should be prepared for handover with respect to a user equipment unit. The target cell is neighbored by a set of neighboring cells, the set of neighboring cells including a first subset of neighboring cells and a second subset of neighboring cells, with the user equipment unit being permitted access to radio resources or to handover to cells in the first subset but not cells in the second subset. In accordance with the determination, a message including a filtered list of cells is sent to the user equipment unit, the filtered list of cells including the first subset but not the second subset. The filtered list of cells can comprise, for example, a list of cells for whose frequencies the user equipment unit is to perform measurements. Which nodes perform the actions of (1) determining an allowed area(s) for the user equipment unit; and (2) preparing the filtered list of cells using the allowed area(s) depends on which of various alternative implementations are utilized.

In accordance with a first alternative, the drift radio network control node both determines the allowed area(s) for the user equipment unit and performs the filtering. In particular, the serving radio network control node transmits to the drift radio network control node an identification of the target cell and an identification of the user equipment unit. The drift radio network control node determines the allowed area(s) and performs the filtering, after which the drift radio network control node transmits to the serving radio network control node the filtered list.

In accordance with a second alternative, the serving radio network control node determines the allowed area(s) for the user equipment unit (by, for example, consulting a table maintained at the serving radio network control node). The serving radio network control node transmits to the drift radio network control node an identification of the target cell and a list of allowed area(s) for the user equipment unit. The drift radio network control node then prepares the filtered list of cells using the allowed area(s), and transmits the filtered list to the serving radio network control node.

In accordance with a third alternative, the serving radio network control node both determines the allowed area(s) for the user equipment unit and prepares the filtered list of cells using the allowed area(s). In this third alternative, the serving radio network control node sends to the drift radio network control node an identification of the target cell, and the drift radio network control returns to the serving radio network control node a list of neighboring cells for the target cell. Upon receiving the list of neighboring cells for the target cell, the serving radio network control node serving radio network control node determines the allowed area(s) for the user equipment unit at the serving radio network control node by, e.g., consulting a table maintained at the serving radio network control node.

In accordance with a fourth alternative, the step of determining the allowed area(s) for the user equipment unit is performed at a core network, but the filtered list of cells is prepared at the drift radio network control node using the allowed area(s). The serving radio network control node receives a list of allowed area(s) from the core network, and transmits the list of allowed area(s) and an identification of the target cell to the drift radio network control node. The drift radio network control node prepares the filtered list, and transmits the filtered list to the serving radio network control node.

In accordance with a fifth alternative, the step of determining the allowed area(s) for the user equipment unit is (like the fourth alternative) performed at a core network. However, the filtered list of cells is prepared at the serving radio network control node using the allowed area(s). In the fifth alternative, the serving radio network control node transmits to the drift radio network control node an identification of the target cell for the user equipment unit. In return, the drift radio network control node transmits to the serving radio network control node a list of neighboring cells for the target cell. The serving radio network control node uses the list of allowed area(s) to prune the list of neighboring cells and thereby generate the filtered list.

In the fourth and fifth alternatives, the core network can develop the list of allowed area(s) in any of various modes. In a first example mode, the list of allowed area(s) for the user equipment unit is determined by consulting a table maintained at a core network node. In a second example mode, determining the list of the allowed area(s) for the user equipment unit involves consulting a record in a home location register (HLR) for the user equipment unit.

In the various alternatives, the identification of the user equipment unit can be the International Mobile Subscriber Identifier (IMSI) of the user equipment unit. For those alternatives which utilize or transmit a list of allowed areas in the form of a list of allowed networks, such list can be expressed in terms of public land mobile network (PLMN) =MCC/MNC. Further, in the various alternative techniques information can be transmitted from the serving radio network control node to the drift radio network control node in a conventional message such as a RADIO LINK SET UP REQUEST message, while information can be transmitted from the drift radio network control node to the serving in a conventional message such as a RADIO LINK SETUP RESPONSE message.

Preferably, the serving radio network control node determines that the target cell controlled by the drift radio network control node should be prepared for handover with respect to the user equipment unit, and transmits to the user equipment unit the message including the filtered list of cells.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1A, FIG. 2A, FIG. 3A, FIG. 4A, and FIG. 5A are diagrammatic views of example mobile communications system showing respective differing handover techniques.

DETAILED DESCRIPTION

Figure 1B:
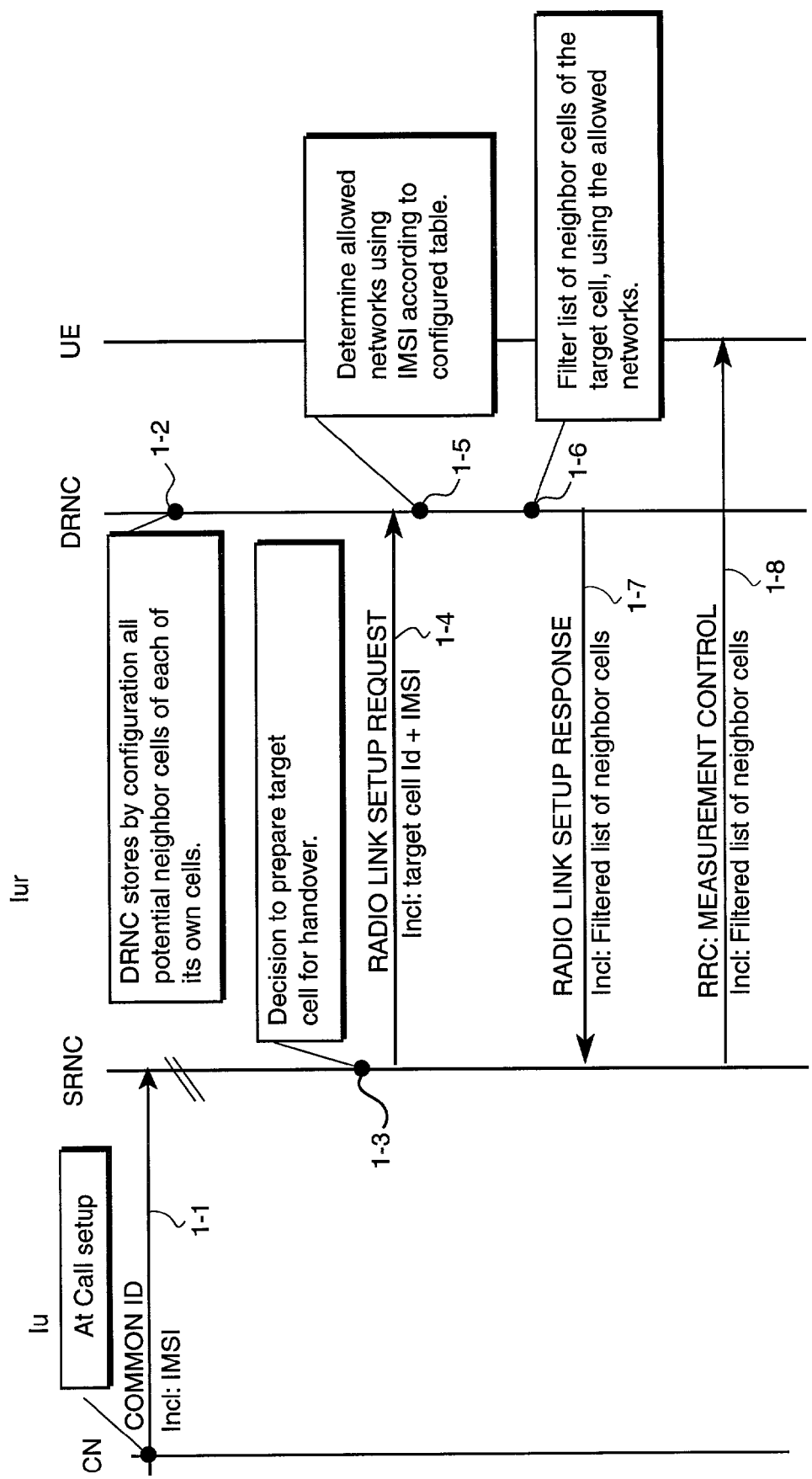
FIG. 1B, FIG. 2B, FIG. 3B, FIG. 4B, and FIG. 5B are signaling diagrams for the corresponding techniques of FIG. 1A, FIG. 2A, FIG. 3A, FIG. 4A, and FIG. 5A, respectively.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

The present invention is described in the non-limiting, example context of a universal mobile telecommunications (UMTS) 10 shown in FIG. 1A. The ensuing description of FIG. 1A is also generally applicable to comparable FIGS. 2A, 3A, 4A, and 5A. A representative external core network(s) 16 may take one or more forms, including either a connection-oriented, external core network (such as, for example, the Public Switched Telephone Network (PSTN) and/or the Integrated Services Digital Network (ISDN)) or a connectionless external core network (e.g., the Internet). Unillustrated service nodes of the core network 16 are connected to one or more radio access networks (RANs) over an interface referred to as the Iu interface. In the illustrated example, the radio access network (RAN) is more specifically known as a UMTS Terrestrial Radio Access Network (UTRAN) 14. The UTRAN 14 includes one or more radio network controllers (RNCs) 26, only two such RNCs $26_1$ and $26_2$ being shown by way of example in FIG. 1A. Each radio network controller (RNC) 26 is connected to and controls one or more base stations (BS) 28. For example, and again for sake of simplicity, two base station nodes are shown connected to each radio network controller 26. In this regard, RNC $26_1$, serves base station $28_{1-1}$ and base station $28_{1-2}$, while RNC $26_2$ serves base station $28_{2-1}$ and base station $28_{2-2}$ and RNC $26_3$ serves base station $28_{3-1}$ and base station $28_{3-2}$. Those skilled in the art will also appreciate that a base station is sometimes also referred to in the art as a radio base station, a node B, or B-node. It will also be appreciated that a different number of base stations can be served by each radio network controller, and that radio network controllers need not serve the same number of base stations. Moreover, a radio network controller can be connected over an Iur interface to one or more other RNCs.

It should be understood that the radio network controllers (RNC) $26_1$, and $26_2$ may be operated as a shared network (e.g., these radio network controllers and the base stations controlled are shared by one or more operators [e.g., telephone service provider companies]). Alternatively, some of the network controllers (RNC) 26 may be shared, while others are not. As a further alternative, all of the radio network controllers (RNC) $26_1$, and $26_2$ may be operated as an unshared network (e.g., only one operator owns both nodes). As such, the present invention applies to all kinds of handovers including the following: (1) handing over from a shared network node to the sharing operator's own RNC (e.g., handing over from a shared serving radio network controller (SRNC) to one of the operator's own drift radio network controllers (DRNC)); (2) handing over from the operator's own serving radio network controller (SRNC) node to a shared drift radio network controller (DRNC); (3) handing over from a shared serving radio network controller (SRNC) to a shared drift radio network controller (DRNC) (e.g., different operators sharing both RNCs); (4) handing over from an operator's own serving radio network controller (SRNC) to the operator's own drift radio network controller (DRNC).

In the illustrated embodiments, each base station 28 is shown as serving three cells C. The cells C shown in FIG. 1A are provided with the same first two subscripts as their corresponding base stations (BS) 28. It will be appreciated by those skilled in the art, however, that a base station may serve for communicating across the air interface for just one cell, or either less or more than the number of cells so illustrated.

A user equipment unit (UE), such as user equipment unit (UE) 30 shown in FIG. 1 communicates with one or more cells or one or more base stations (BS) 28 over a radio or air interface. Each of the radio interface 32, the Iu interface, the Iub interface, and the Iur interface are shown by dash-dotted lines in FIG. 1. Preferably, radio access is based upon Wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality.

Figure 6:
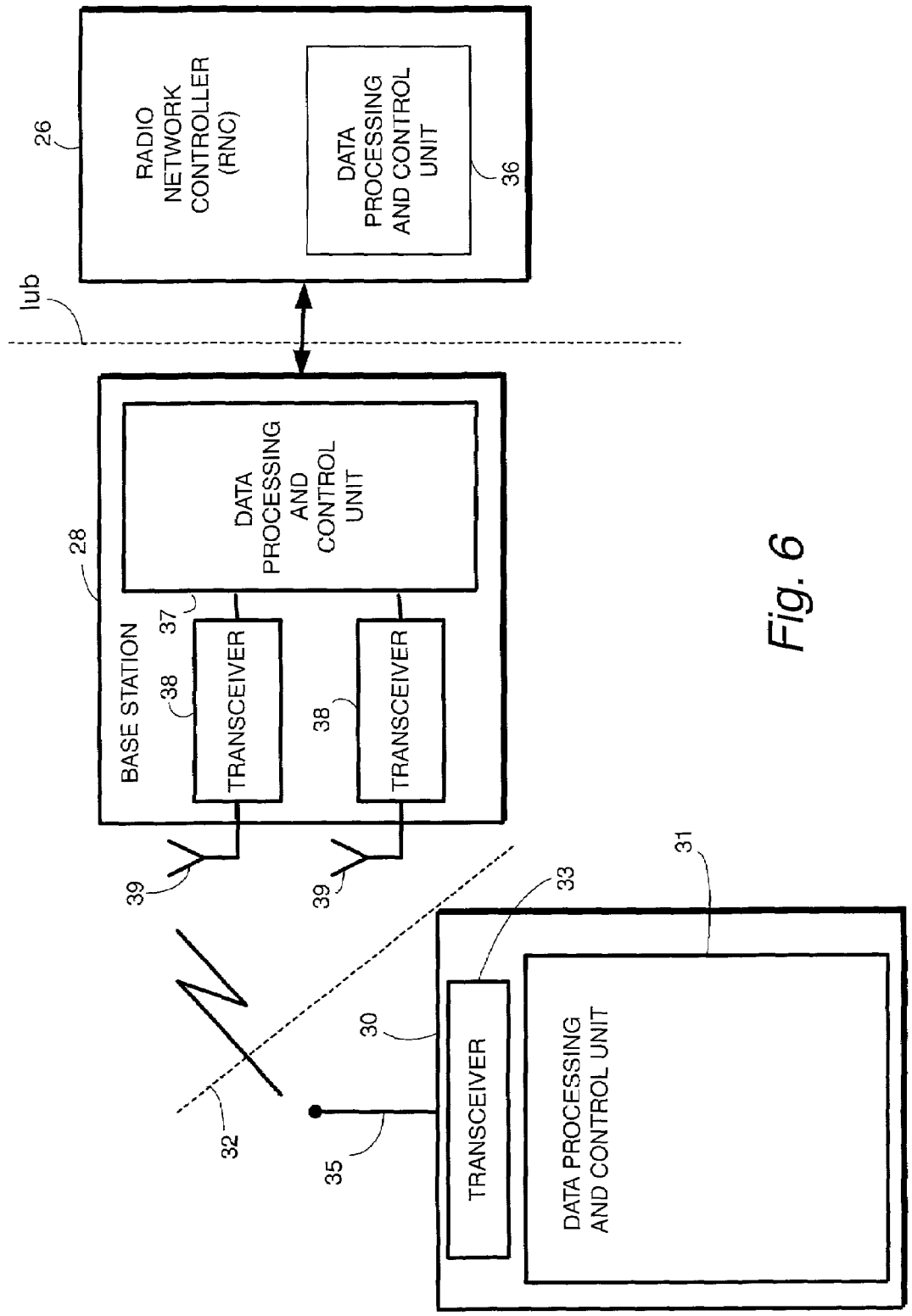
FIG. 6 is a simplified function block diagram of a portion of a UMTS Terrestrial Radio Access Network, including a user equipment unit (UE) station; a radio network controller; and a base station.
Figure 7:
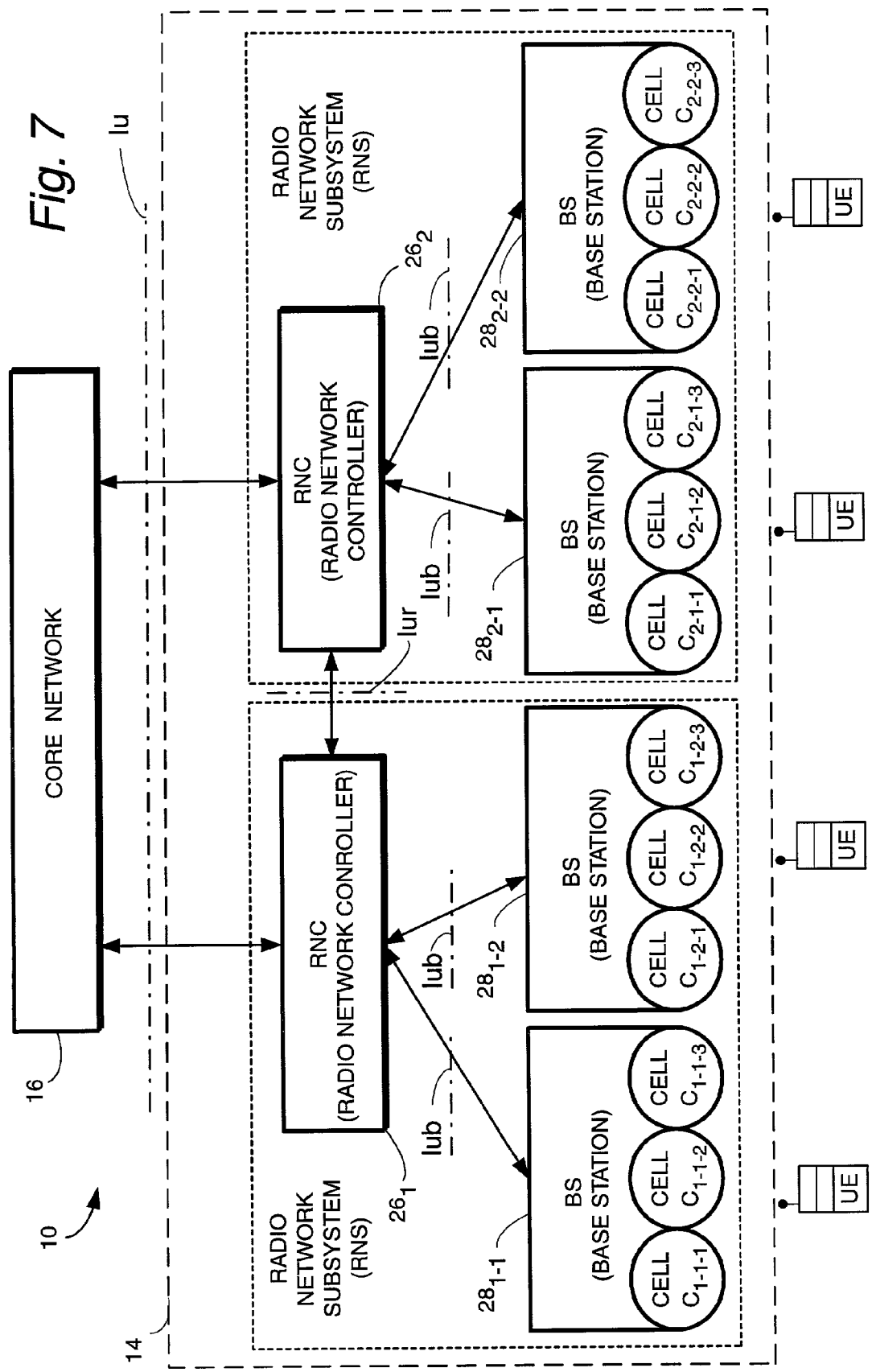
FIG. 7 is diagrammatic view of example mobile communications system in which the present invention may be advantageously employed.
Figure 8:
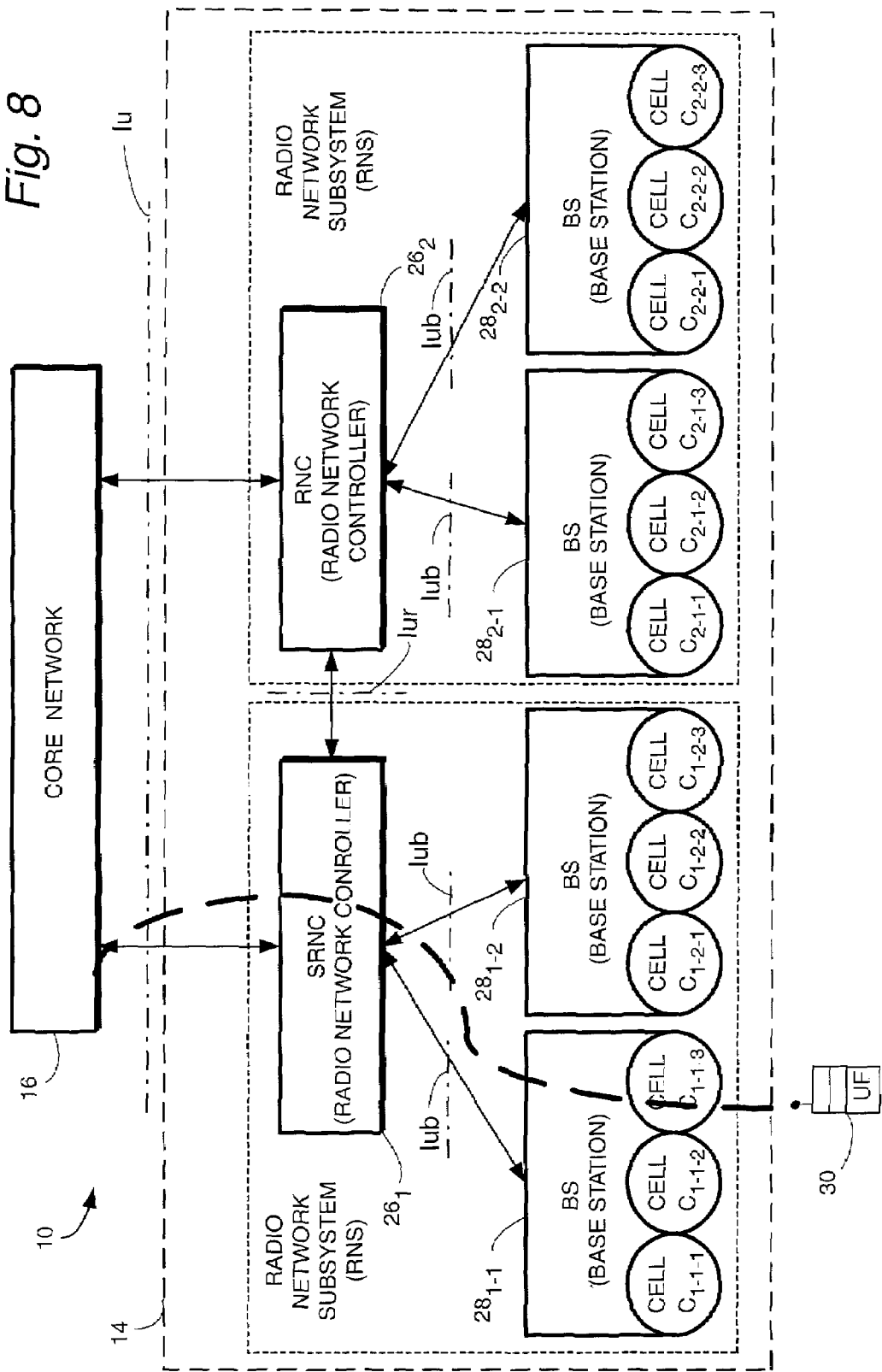
FIG. 8 is a diagrammatic view of the example mobile communications system of FIG. 7, showing an example of RNC roles assignment for one user equipment unit (UE) at initial setup (with no DRNC yet existing).
Figure 9:
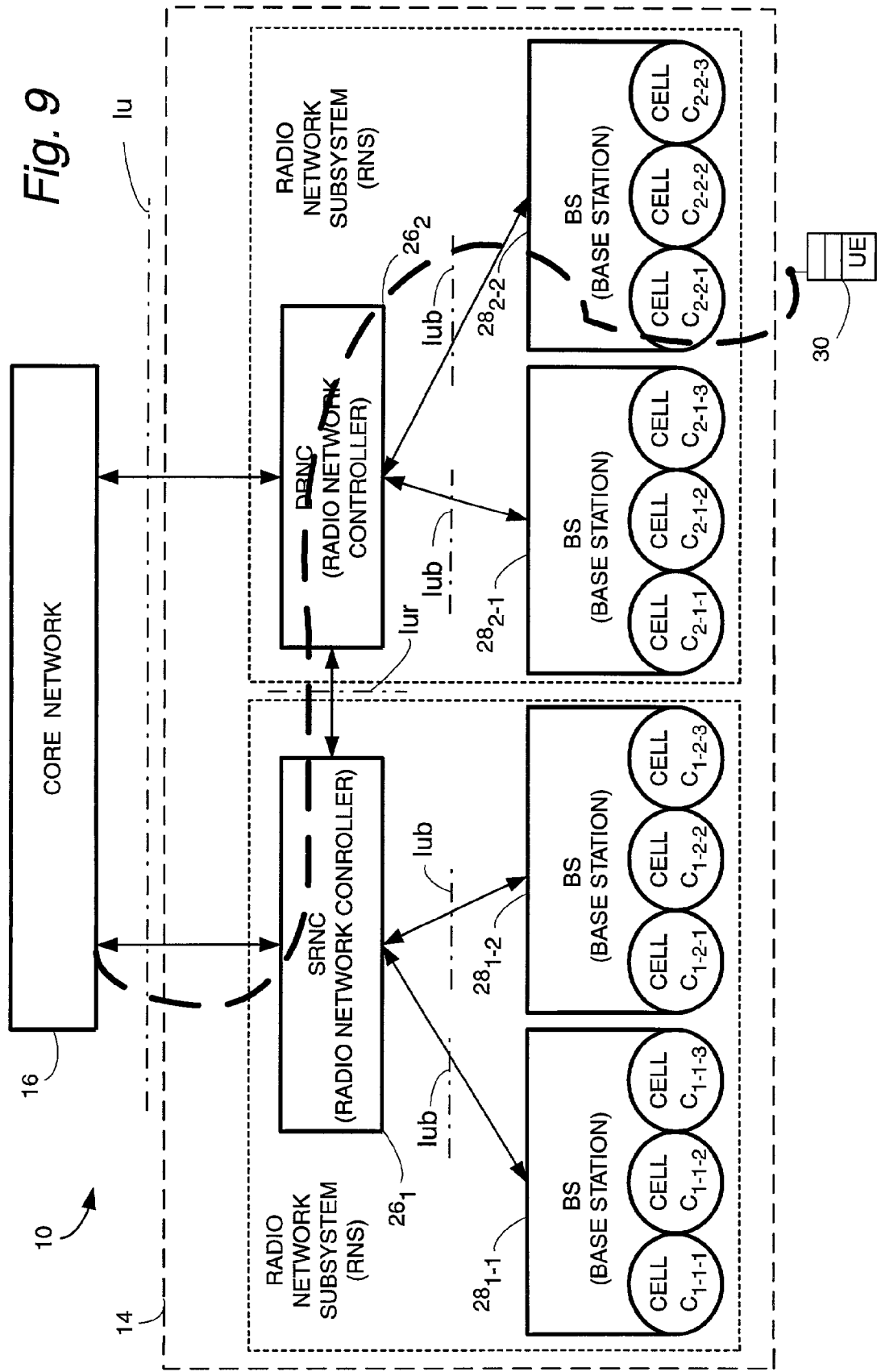
FIG. 9 is a diagrammatic view of the example mobile communications system of FIG. 7, showing an example of RNC roles assignment for one user equipment unit (UE) after successive handovers through the radio access network.

FIG. 6 shows selected general aspects of user equipment unit (UE) 30 and illustrative nodes such as radio network controller 26 and base station 28. The user equipment unit (UE) 30 shown in FIG. 6 includes a data processing and control unit 31 for controlling various operations required by the user equipment unit (UE). The UE's data processing and control unit 31 provides control signals as well as data to a radio transceiver 33 connected to an antenna 35.

The example radio network controller 26 and base station 28 as shown in FIG. 6 are radio network nodes that each include a corresponding data processing and control unit 36 and 37, respectively, for performing numerous radio and data processing operations required to conduct communications between the RNC 26 and the user equipment units (UEs) 30. Part of the equipment controlled by the base station data processing and control unit 37 includes plural radio transceivers 38 connected to one or more antennas 39.

Advantageously, the user equipment unit (UE), e.g., mobile station, is provided with a list of neighbor cells adapted to that specific mobile's subscription. As an example, the user equipment unit (UE) of a subscriber of operator A is provided with a list of neighbor cells only from the shared network and from the individual network A.

To "filter" or "prune" the original list of all neighbor cells down to those appropriate for handover in those situations, information about the user equipment unit's subscription, (e.g., the user equipment unit's home network), may be considered along with information about the neighbor cells. In an illustrated example embodiment, the home network of the user equipment unit can be determined from the IMSI. In addition, the network to which a neighbor cell belongs is part of the UTRAN cell identity stored in the DRNC and transferred to the SRNC.

An example method for implementing certain embodiments of the invention includes three steps:

(1) Based on available mobile subscriber information, determine which areas (e.g., networks identified by PLMN codes=mobile country code (MCC)+mobile network code (MNC)) that the subscriber may access.

(2) perform a filtering of the list of neighbor cells to limit the list to those cells consistent with the mobile's subscription; and (3) send the filtered neighbor cell list to the user equipment unit using standard signaling.

These steps may be implemented in a variety of fashions. Different example alternatives are set forth in Table 1, which gives five basic different example alternatives for allocating step (1) and step (2) to different control nodes (e.g., RNC nodes in a WCDMA context).

TABLE 1

| Alt. | Step 1 determine | Step 2 Filter | Comment |
|---|---|---|---|
| 1 | DRNC | DRNC | IMSI of the subscriber is sent from SRNC to DRNC The DRNC filters using IMSI before returning cell list to SRNC |
| 2 | SRNC | DRNC | The list of allowed areas (e.g., MCC + MNC) of the subscriber is sent from SRNC to DRNC The DRNC filters using this info and returns filtered cell list to SRNC Requires additions to 3GPP R99 standard, by including a list of allowed areas (e.g., MCC + MNC) of the subscriber in the Iur RNSAP message RADIO LINK SETUP REQUEST |
| 3 | SRNC | SRNC | DRNC returns the full neighbor cell list over Iur to the SRNC The SRNC determines allowed areas of the subscriber and filters the cell list. |
| 4 | CN | DRNC | The CN determines the allowed areas (e.g., MCC + MNC) of the subscriber. Two approaches: (1) A configured table in the MSC (2) A record in the HLR for allowed areas of a specific subscriber, which is downloaded to the MSC. (Impact on 3GPP approach: addition of list of allowed areas (e.g., MCC + MNC) to MAP message INSERT SUBSCRIBER DATA) The CN passes the allowed areas (e.g., MCC + MNC) to the SRNC over Iu (addition to Iu RANAP message COMMON ID) SRNC forwards allowed areas over Iur to DRNC and DRNC performs filtering (as in alt. 2) Requires additions to 3GPP approach: Iu, Iur and possibly in CN. |
| 5 | CN | SRNC | The CN determines the allowed areas (e.g., MCC + MNC) of the subscriber. Two approaches: (1) A configured table in the MSC (2) A record in the HLR for allowed areas of a specific subscriber, which is downloaded to the MSC. Impact on 3GPP approach: addition of list of allowed MCC + MNC to MAP message INSERT SUBSCRIBER DATA) The CN passes the allowed areas (e.g., MCC + MNC) to the SRNC over Iu (addition to Iu RANAP message COMMON ID) The DRNC sends the full list of neighbor cells over Iur SRNC performs filtering of the cell list received from the DRNC Requires additions to 3GPP approach: Iu and possibly in CN. |

A first alternative summarized in Table 1 is described with reference to FIG. 1A and FIG. 1B; a second alternative is described with reference to FIG. 2A and FIG. 2B; and so forth. For each paired set of figures, the "A" suffixed figure provides a diagrammatic view of the network, while the "B" suffixed figure is a corresponding example signal diagram.

The term "allowed area" or "allowed area(s)" as utilized generally herein and with respect to the five alternatives described below is not limited to any specify manner of defining an area for which handover is permitted or allowed. As one example, an allowed area can be an allowed network (which can be expressed, for example, as a network code (e.g. MCC+MNC)). Other examples of "allowed area" or "allowed area(s)" include location area (LA) or a "localized service area". In some instances, these other example manifestations of allowed area are also expressed using a network code (e.g. MCC+MNC) and perhaps other parameters or information.

In the first alternative illustrated in FIG. 1A and FIG. 1B, as action 1-1 the IMSI of the user equipment unit (UE) is sent from core network 16 to SRNC node 26$_1$. The IMSI may be, for example, part of a COMMON ID message which is sent at call setup. FIG. 1B shows, that as event 1-2, the drift RNC (DRNC) 26$_2$ has stored (by node configuration) all potential neighbor cells of each of the cells controlled by DRNC 26$_2$. At some point, represented by event 1-3 in FIG. 1B, a decision is made to prepare a target cell for handover. After such handover decision is made, as action 1-4 the SRNC 26$_1$ sends the IMSI of the user equipment unit (UE) involved in the handover to DRNC $26_2$. The IMSI can be included, for example, in a RADIO LINK SETUP REQUEST message which further includes, e.g. an identifier for the target cell. Then, as event 1-5, the DRNC $26_2$ determines the allowed areas for user equipment unit (UE) using the IMSI (received in the message of action 1-4) according to the network/area information stored at the drift radio network control node. As event 1-6 the DRNC $26_2$ performs a filtering to obtain a filtered cell list. The filtering comprises essentially pruning a list of neighboring cells which neighbor the target cell in accordance with the allowed area(s) for the user equipment unit (UE). As action 1-7 the filtered cell list is sent by DRNC $26_2$ to SRNC 26, in, for example, a RADIO LINK SETUP RESPONSE message. Then, as action 1-8, the SRNC 26, can send the filtered list of neighbor cells to the user equipment unit (UE) in a message such as a radio resource control (MEASUREMENT CONTROL) message.

Figure 2A:
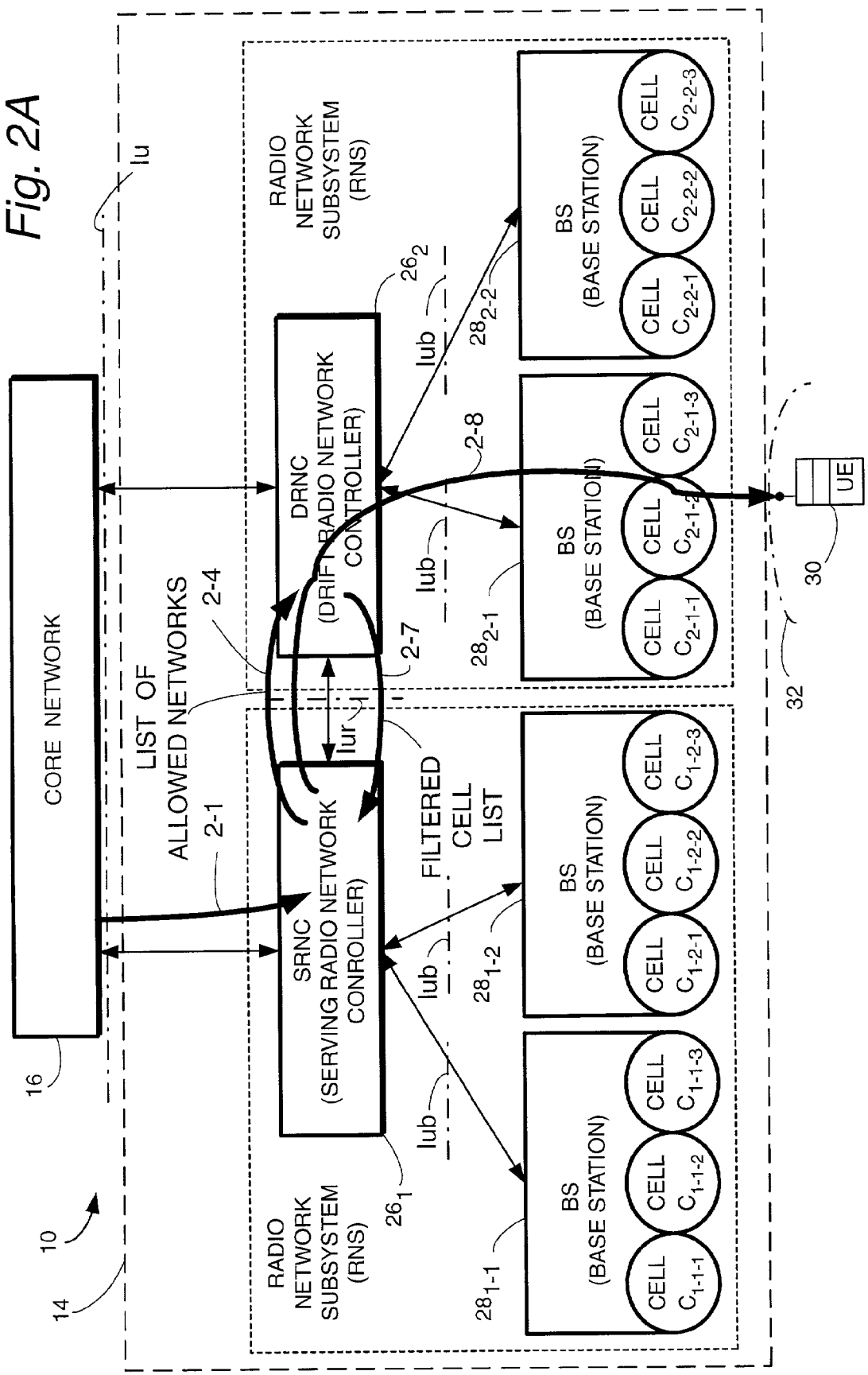
Figure 2B:
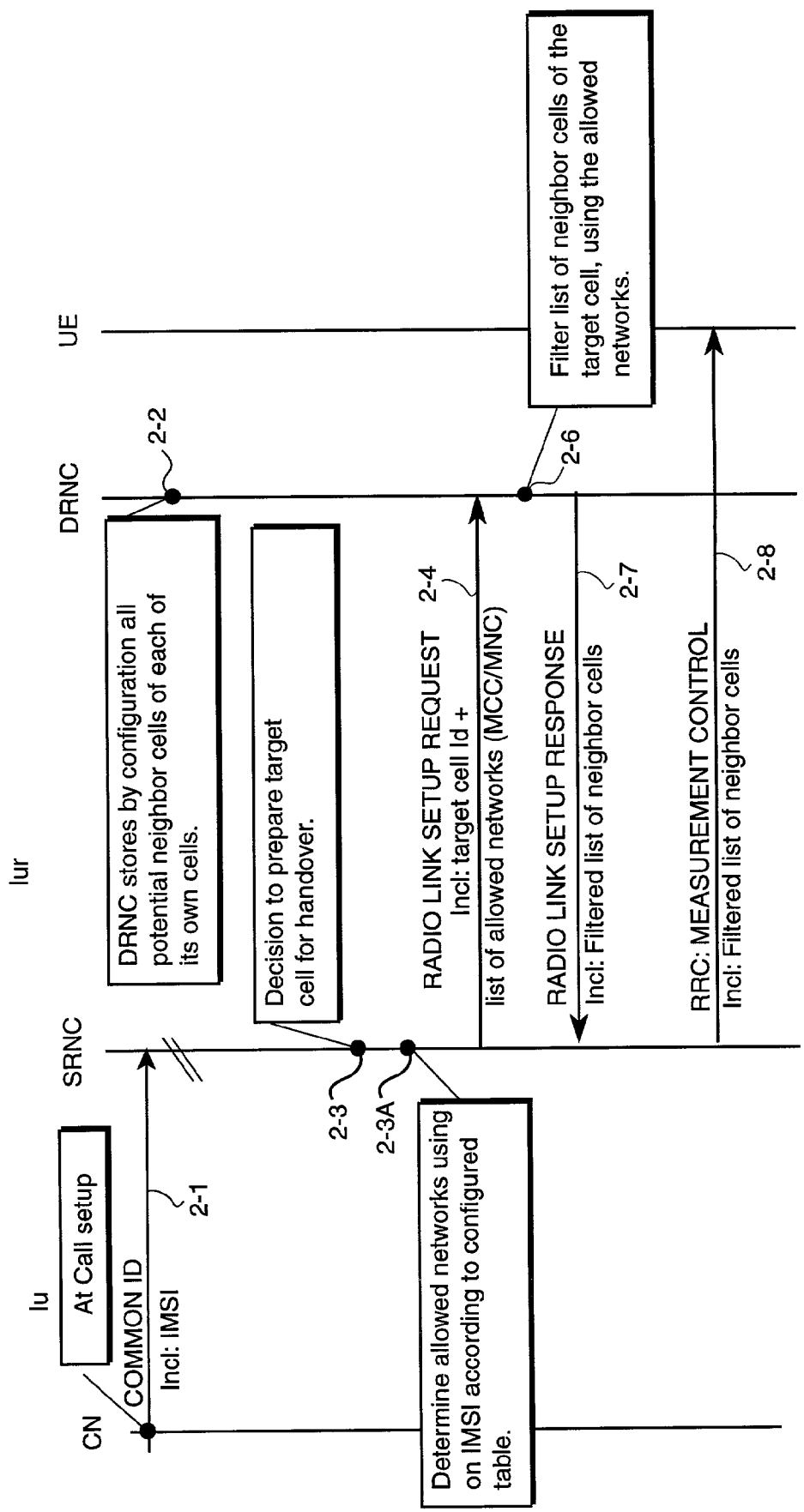

In the second alternative illustrated in FIG. 2A and FIG. 2B, as action 2-1 the IMSI of the user equipment unit (UE) is sent from core network 16 to SRNC node $26_1$. As in the first alternative, the IMSI may be, for example, part of a COMMON ID message which is sent at call setup. As in the case of the first alternative, FIG. 2B shows, as event 2-2, that the drift RNC (DRNC) $26_2$ has stored (by node configuration) all potential neighbor cells of each of the cells controlled by DRNC $26_2$. At the point represented by event 2-3 in FIG. 1B, a decision is made to prepare a target cell for handover. After such handover decision is made, as action 2-3A the SRNC $26_1$ determines allowed areas for the user equipment unit (UE). In the determination of action 2-3A, the SRNC 26, uses the IMSI of the user equipment unit (UE) involved in the handover and a configured table stored at SRNC $26_1$. Then, as action 2-4, the SRNC $26_1$ sends a list of allowed areas (e.g., MCC+MNC for allowed networks) of the subscriber to DRNC $26_2$. The list of allowed areas can be included, for example, in a RADIO LINK SETUP REQUEST message which further includes, e.g. an identifier for the target cell. Then, as event 2-6 the DRNC $26_2$ performs a filtering to obtain a filtered cell list. As action 2-7 the filtered cell list is sent by DRNC $26_2$ to SRNC $26_1$ in, for example, a RADIO LINK SETUP RESPONSE message. Then, as action 2-8, the SRNC $26_1$ can send the filtered list of neighbor cells to the user equipment unit (UE) in a message such as a radio resource control (MEASUREMENT CONTROL) message. This example of the second alternative requires additions to 3GPP R99 standard by including a list of allowed areas (MCC+MNC) of the subscriber in the Iur RNSAP message RADIO LINK SETUP REQUEST.

Figure 3A:
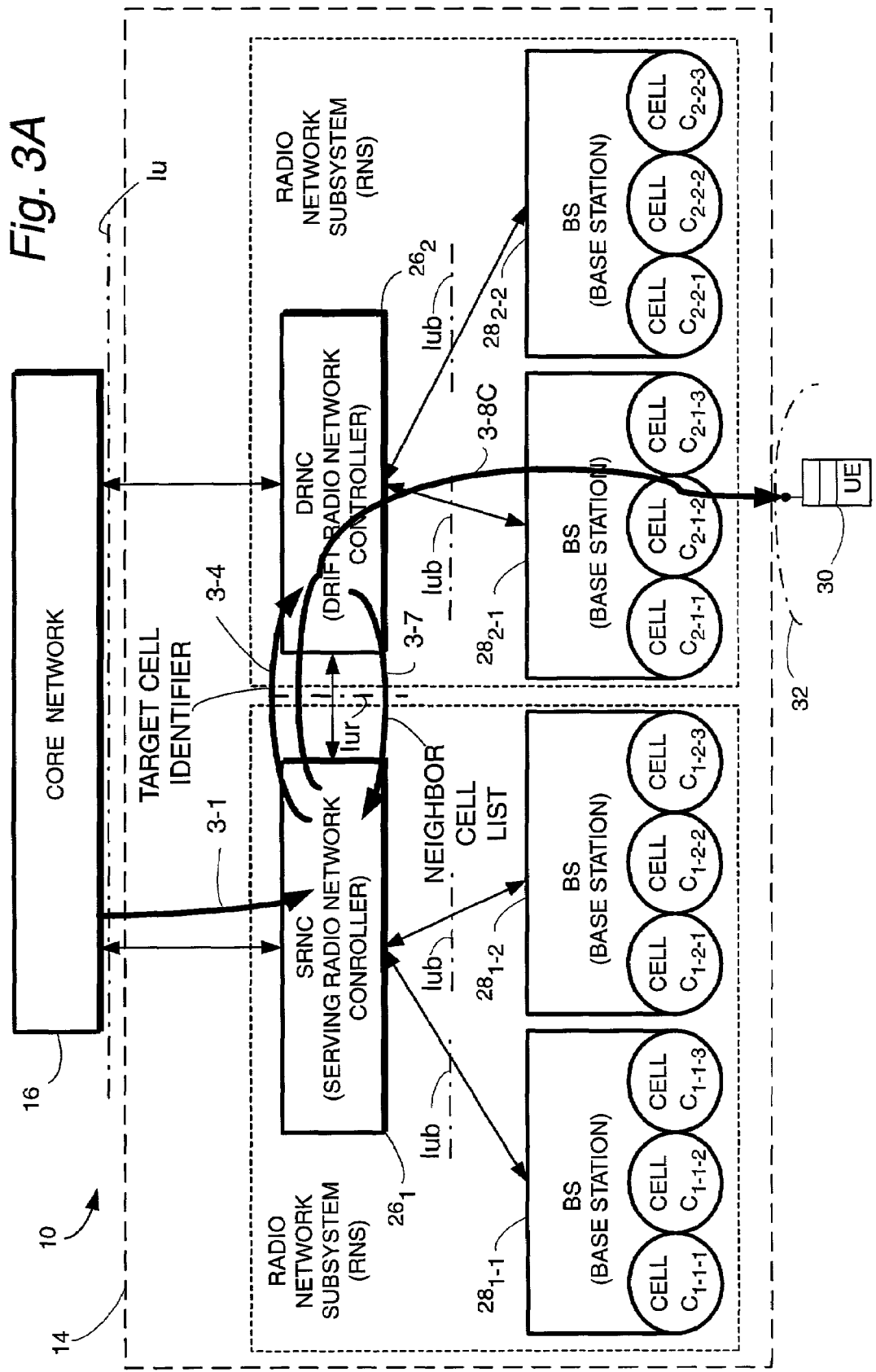
Figure 3B:
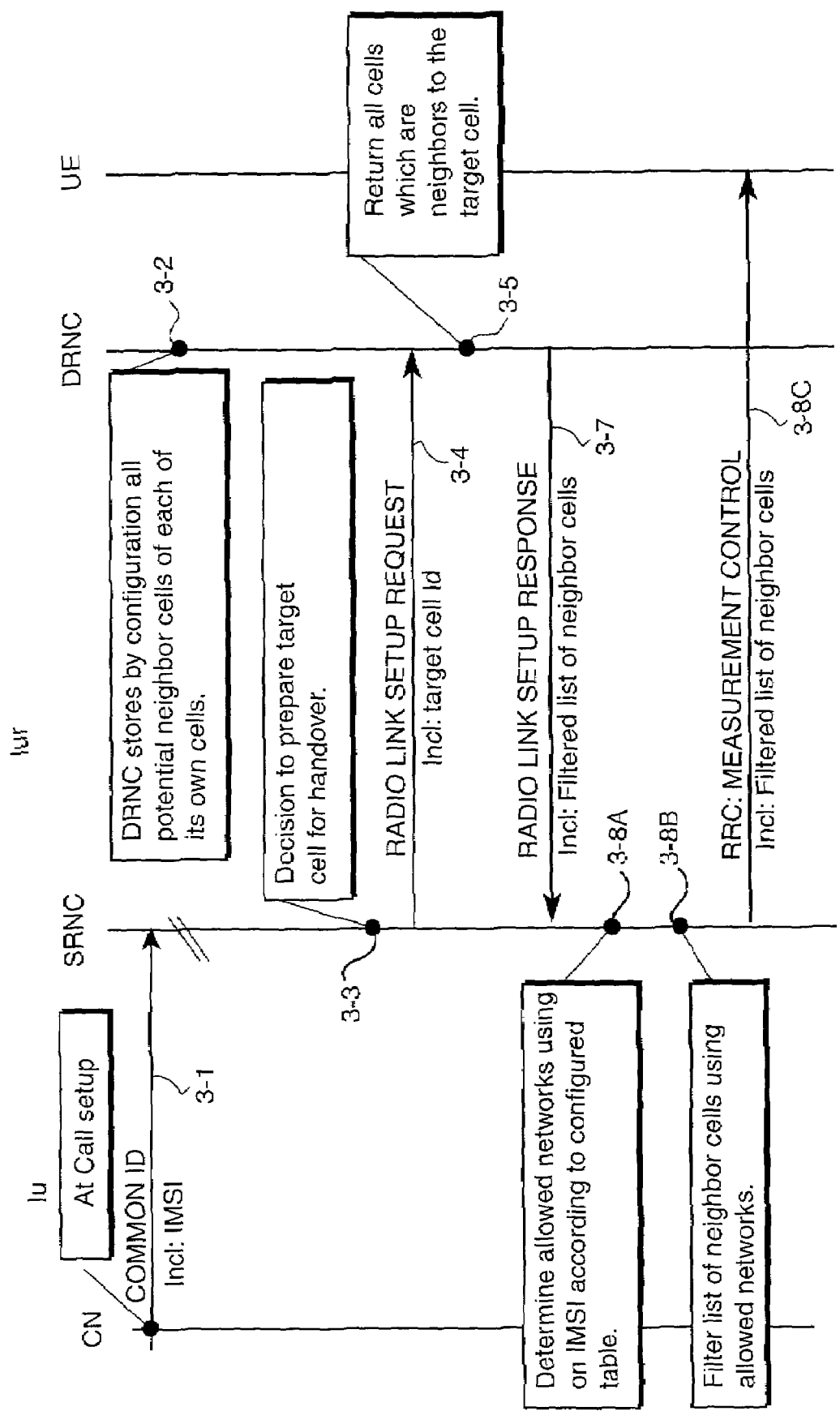

In the third alternative illustrated in FIG. 3A and FIG. 3B, action 3-1, event 3-2, and action 3-3 are essentially the same as correspondingly suffixed actions/events of the first and second alternatives. After the decision of event 3-3 to prepare a target cell for handover, as event 3-4 the SRNC $26_1$ sends an identification of the target cell (for the handover) to DRNC $26_2$. As in the previous examples of the other alternatives, the target cell identifier can be sent to the DRNC $26_2$ in a message such as a RADIO LINK SETUP REQUEST message. As event 3-5, the DRNC $26_2$ determines all cells which are neighbors of the target cell. Then, as action 3-7, the DRNC $26_2$ returns the full neighbor cell list over the Iur interface to the SRNC $26_1$ in a message such as a RADIO LINK SETUP RESPONSE message. Upon receipt of the full list of neighboring cells, as event 3-8A, the SRNC $26_1$ determines, for the user equipment unit (UE) involved in the handover, which networks are allowed areas.

The determination of event 3-8A is performed by SRNC $26_1$ using the IMSI of the user equipment unit (UE) and a configured table of networks stored at SRNC $26_1$. After determining the allowed areas for the user equipment unit (UE) involved in the handover, as action 3-8B the SRNC $26_1$ uses the allowed areas to filter the full cell list obtained from the DRNC $26_2$. Then, after obtaining the filtered cell list, the filtered cell list is sent as action 3-8C to user equipment unit (UE) in a message such as a RRC MEASUREMENT CONTROL MESSAGE. Advantageously, this third alternative requires no changes to the 3GPP R99 standard.

Figure 4B:
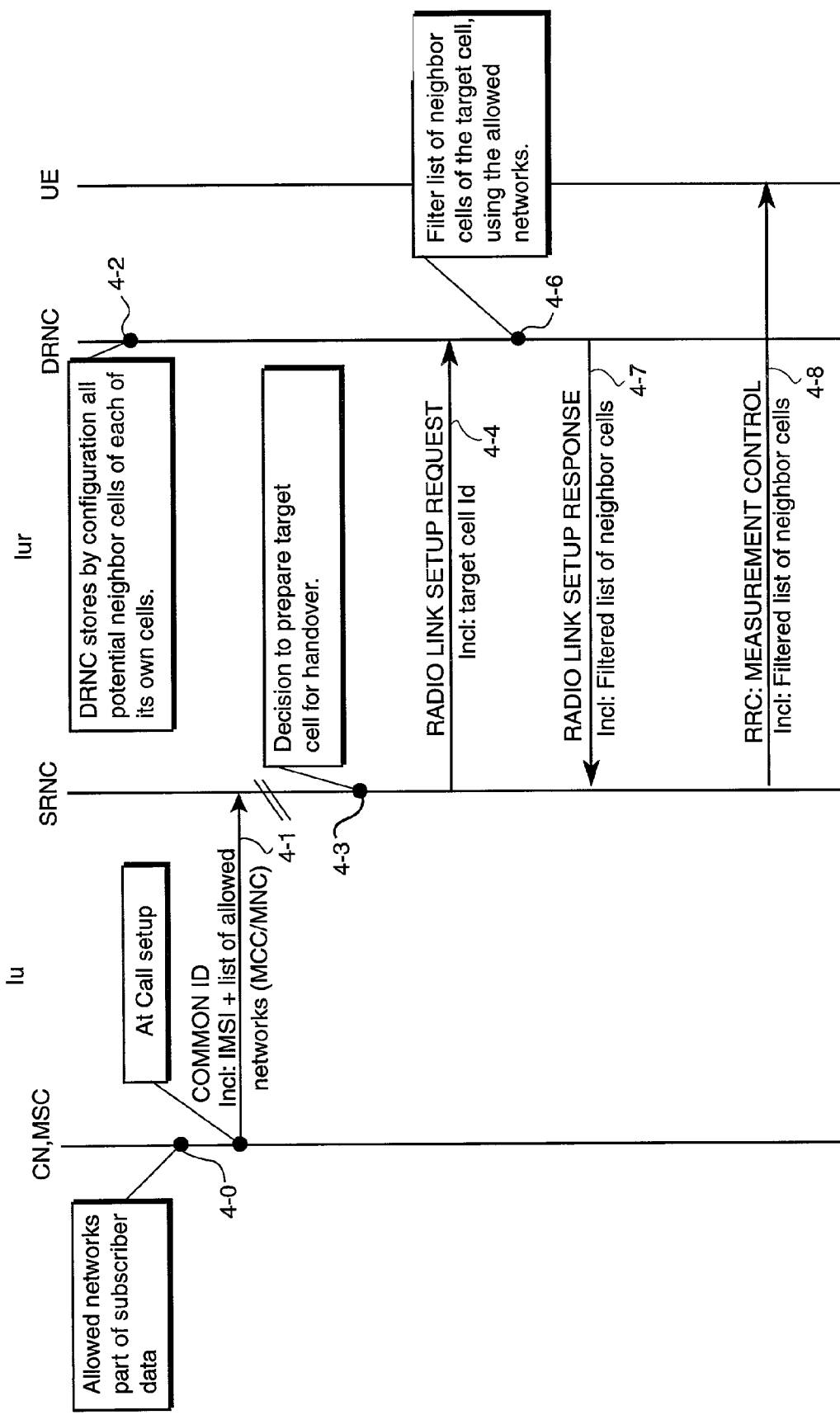
Figure 5B:
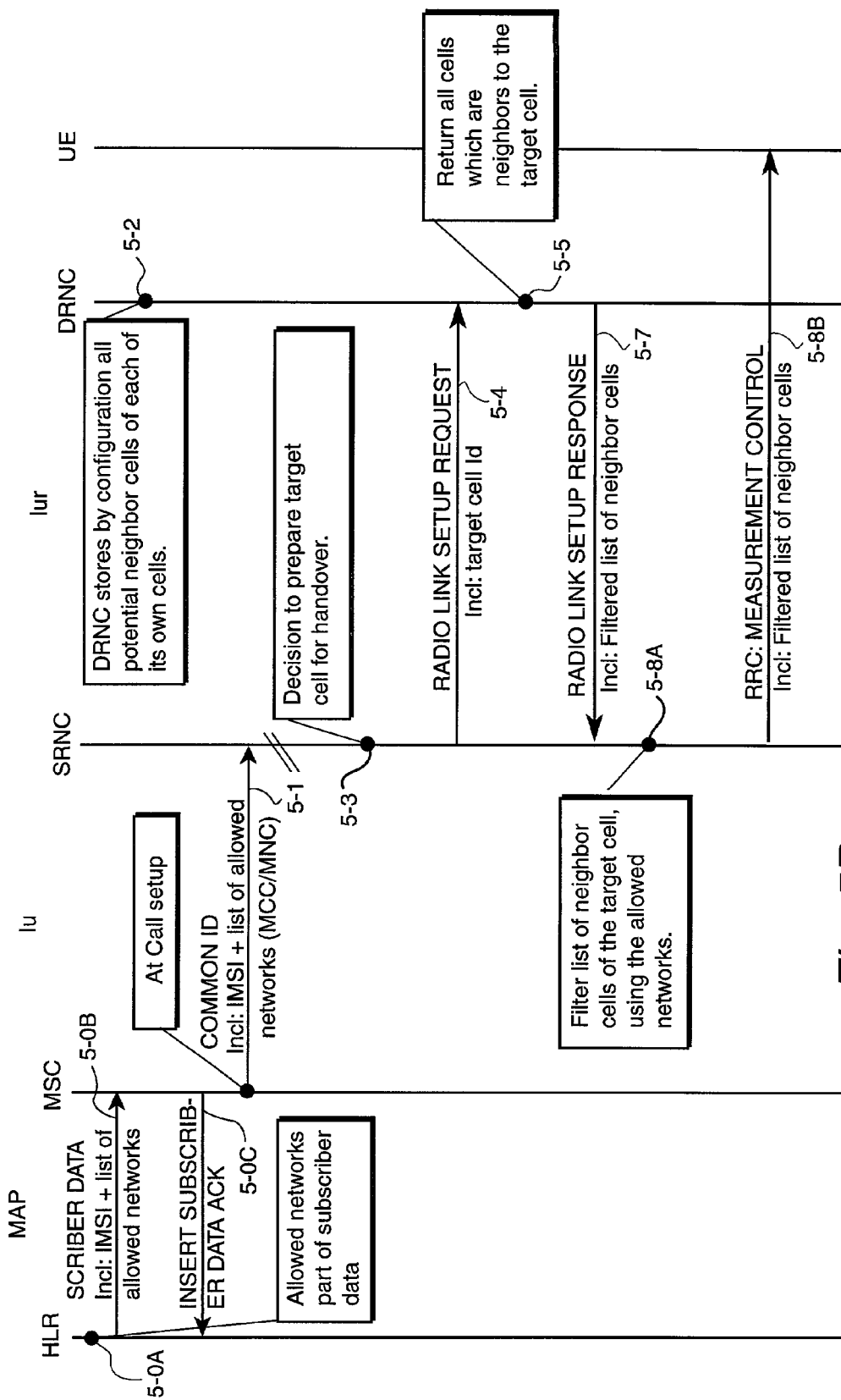

In the fourth alternative illustrated in FIG. 4A and FIG. 4B, as action 4-0 the core network (CN) determines the allowed areas (e.g., MCC+MNC) of the subscriber. Such determination by the core network(s) is facilitated in either of various modes, including a first mode wherein a configured table of networks is maintained by the core network(s) and a second mode in which a record for allowed areas for a specific subscriber is maintained in the home location register (HLR) of that subscriber. In the second mode, the record is downloaded to the MSC. The first mode is particularly illustrated in FIG. 4B (the second mode being understood from subsequently described FIG. 5B pertaining to the fifth alternative). As action 4-1, the core network CN passes the allowed areas (e.g., MCC+MNC) and the IMSI of the user equipment unit (UE) to the SRNC $26_1$ over Iu interface. The transmission of the allowed areas in this manner can involve additional field(s) in a conventional message such as the COMMON ID Iu RANAP message. Event 4-2 and action 4-3 of the fourth alternative resemble those of previously described alternatives, with action 4-3 being the decision by SRNC $26_1$ to prepare a target cell for handover. As action 4-4, the SRNC $26_1$ sends a list of allowed areas (e.g., MCC+MNC) for the subscriber to DRNC $26_2$. The list of allowed areas can be included, for example, in a RADIO LINK SETUP REQUEST message which further includes, e.g. an identifier for the target cell. Then, as event 4-6 the DRNC $26_2$ performs a filtering to obtain a filtered cell list. As action 4-7 the filtered cell list is sent by DRNC $26_2$ to SRNC $26_1$ in, for example, a RADIO LINK SETUP RESPONSE message. As action 4-8, the SRNC $26_1$ can send the filtered list of neighbor cells to the user equipment unit (UE) in a message such as a radio resource control (MEASUREMENT CONTROL) message. This example of the fourth alternative requires additions to 3GPP R99 standard and possibly modifications to standards governing the Iu interface, the Iur interface, and possibly modifications to core network procedures. For example, the list of allowed areas (e.g., MCC+MNC) would be added to the MAP message INSERT SUBSCRIBER DATA.

The fifth alternative (illustrated in FIG. 5A and FIG. 5B) begins in like manner as the fourth alternative, e.g., with the core network(s) determining the allowed areas (e.g., MCC+MNC) of the subscriber. Again, like the fourth alternative, the core network determination can be performed in either of two example modes, including a first mode wherein a configured table of networks is maintained by the core network(s) and a second mode in which a record for allowed areas for a specific subscriber is maintained in the home location register (HLR) of that subscriber. The second mode is particularly illustrated in FIG. 5B, with event 5-0A reflecting storage of a list of allowed areas for a subscriber as part of a subscriber record in the home location register (HLR) of the subscriber. As action 5-0B, the record with the list of allowed areas is downloaded to the MSC in an appropriate message, such as a INSERT SUBSCRIBER DATA message. The MSC also receives the IMSI of the subscriber/user equipment unit (UE), e.g., in the same message. An acknowledgement of receipt of the message of action 5-0B is returned as action 5-0C (e.g. an INSERT SUBSCRIBER DATA ACK message). Thus, this second mode has an impact on the 3GPP approach, involving an addition of list of allowed MCC+MNC to the MAP message INSERT SUBSCRIBER DATA.

As action 5-1 the core network CN (particularly the MSC in the second mode) passes the allowed areas (e.g., MCC+MNC) and the IMSI of the user equipment unit (UE) to the SRNC $26_1$ over Iu interface. The transmission of the allowed areas in this manner can involve additional field(s) in a conventional message such as the COMMON ID Iu RANAP message. Event 5-2 and event 5-3 of the fifth alternative resemble those of previously described alternatives, with event 5-3 being the decision by SRNC $26_1$ to prepare a target cell for handover. As action 5-4, the SRNC $26_1$ sends an identification of the target cell (for the handover) to DRNC $26_2$. As in the previous examples of the other alternatives, the target cell identifier can be sent to the DRNC $26_2$ in a message such as a RADIO LINK SETUP REQUEST message. As event 5-5, the DRNC $26_2$ determines all cells which are neighbors of the target cell. Then, as action 5-7, the DRNC $26_2$ returns the full neighbor cell list over the Iur interface to the SRNC $26_1$ in a message such as a RADIO LINK SETUP RESPONSE message. Upon receipt of the full list of neighboring cells, as event 5-8A the SRNC $26_1$ uses the allowed areas to filter the full cell list obtained from the DRNC $26_2$. Then, after obtaining the filtered cell list, the filtered cell list is sent as action 5-8B to user equipment unit (UE) in a message such as a RRC MEASUREMENT CONTROL MESSAGE. Therefore, in addition to what has been mentioned previously, this example of the fifth alternative requires additions to 3GPP R99 standard and possibly modifications to standards governing the Iu interface and possibly modifications to core network procedures.

The first alternative advantageously has no impact on the 3GPP approach, and therefore, can be readily supported systems that support 3GPP. The first alternative has an advantage in that the tables for determining allowed areas need only be present in the DRNCs that actually have cells from individual networks as neighbor cells. In the third alternative, the filtering tables must be present in all RNCs in the shared network, since any of them potentially could end up needing to do the filtering. The first alternative also reduces the size of neighbor cell lists transferred over the Iur interface.

Regardless of where the allowed areas are determined, the determination may be performed as described below with reference to Table 2. Table 2 shows IMSI number series ranges as entries, e.g., in the RNC. The first part of the IMSI, i.e., the MCC+MNC (mobile country code+mobile network code), may be used. For each entry in Table 2, a number of MCC/MNCs are listed, indicating the networks to which the corresponding subscribers are allowed to make handover, e.g., operators A and B share a network with MCC/MNC=C.

TABLE 2

| Subscribers home network (IMSI) | Allowed neighbor network MCC/MNC |
|---|---|
| MCC/MNC = A | MCC/MNC = A (MCC/MNC = C is not needed to be indicated, it is always allowed) |
| MCC/MNC = B | MCC/MNC = B, MCC/MNC = D (operators B and D have agreements for national roaming and handover) |
| MCC/MNC = E (roaming subscriber from partner of operator A) | MCC/MNC = A |
| MCC/MNC = F (roaming subscriber from operator having agreement with both A and B) | MCC/MNC = A; MCC/MNC = B |

Even if a roaming subscriber is allowed to access both A and B, as exemplified above, a normal case would be to make a static division for roaming subscribers configured in the table. Operators A and B thus agree which external subscribers shall always come to A and which shall always come to B, and enter that information into the table.

To filter the list/table, the RNC removes all cells from the neighbor cell list having an MCC/MNC which is not included in the table for the particular IMSI series. In the case where both networks A and B are allowed, the following alternatives exist:

Leave both A and B cells in the list, sending all cells to the mobile. This means more cells to measure for the mobile, but radio conditions will govern which network the user equipment unit ends up in.

Random selection of cells to be included in list.

In any system where neighbor cell lists for handover measurements are transmitted to the user equipment units, this invention provides efficient support for handover between a shared network and two or more individual networks, especially with regards to neighbor cell signalling and measurements. A neighbor cell list to be sent to the user equipment unit is first filtered based on the home network of the user equipment unit subscriber to remove neighbor cells that belong to a network that the mobile subscriber cannot or should not access. In a radio access network that includes both serving and drift RNCs, even though the drift RNC transmits a full list of neighbor cells to the serving RNC, the serving RNC filters that cell list using the IMSI of the mobile subscriber. If the serving RNC provides the IMSI of the mobile subscriber to the DRNC, the DRNC may filter the neighbor cell list itself using this IMSI before sending the filtered cell list to the SRNC.

The node which performs the filtering should know the home PLMN of the user equipment unit potentially involved in the handover. As seen from the foregoing, at call setup or at handover from another network, the home PLMN-id (e.g., IMSI) of the user equipment unit can be sent to the filtering node (e.g., serving radio network control node or drift radio network control node). The PLMN-id for the cells in the list of neighboring cells can be used to treat user equipment units with different home PLMN-ids separately.

Figure 10:
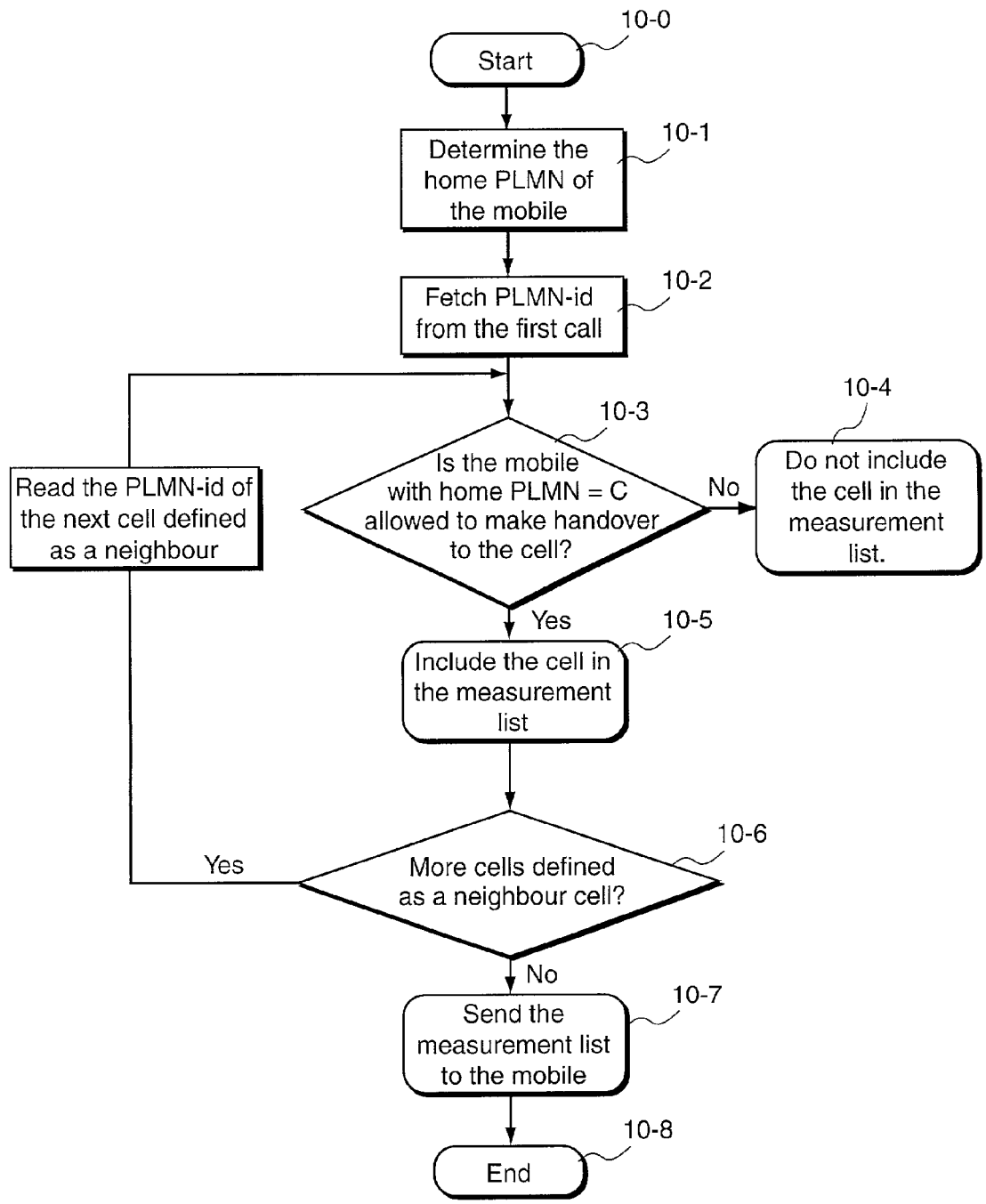
FIG. 10 is a flowchart showing a filtering technique in accordance with an example aspect of the present invention.

FIG. 10 shows how access control in the radio access network can restrict which user equipment units are allowed to make handover to a certain cell, illustrated for example in the context of either the first alternative or the third alternative (e.g., alternatives in which both the IMSI and the full list of neighboring cells are know to the filtering node). After the filtering procedure is begun (step 10-0), the filtering node determines (as step 10-1) the home PLMN of the user equipment unit prospectively involved in the handover. In the FIG. 10 illustration, it is presumed that the PLMN-id of the user equipment unit is "C", and that the target cell is cell "A". Cells which neighbor cell A are possible handover candidates, but may belong to differing PLMNs, which is stored as cell data. Then, as step 10-2, the filtering node fetches the PLMN-id for the first cell in a list of neighboring cells of the target cell. A check is made at step 10-3 whether the user equipment unit with the home PLMN ascertained at step 10-1 is allowed to make handover to the cell whose PLMN-id was fetched at step 10-2. If not, as indicated by step 10-4 the cell is not included in the filtered list (e.g., not included in the measurement list). If the determination at step 10-3 is positive, at step 10-5 the cell whose PLMN-id was fetched at step 10-2 is included in the filtered list. After a first cell in the list of neighboring cells has been so processed, at step 10-6 a check is made whether further cells in the list of neighboring cells remain to be processed. If the determination at step 10-6 is affirmative, as step 10-7 the filtering node obtains the PLMN-id of the next cell in the list of neighboring cells for the target cell. Thereafter, step 10-3 and one of either step 10-4 or step 10-5 are repeated for this next cell, so that the next cell is either included (step 10-5) or excluded (step 10-4) from the filtered list. After the entire list of neighboring cells for the target cell has been so processed, the filtered list is transmitted as step 10-7 to the user equipment unit. The filtered list may be sent to the user equipment unit by the filtering node in the case of the third alternative, or sent by the filtering node to the serving radio network control node which in turns transmits the filtered list to the user equipment unit as in the case of the first alternative.

Figure 11:
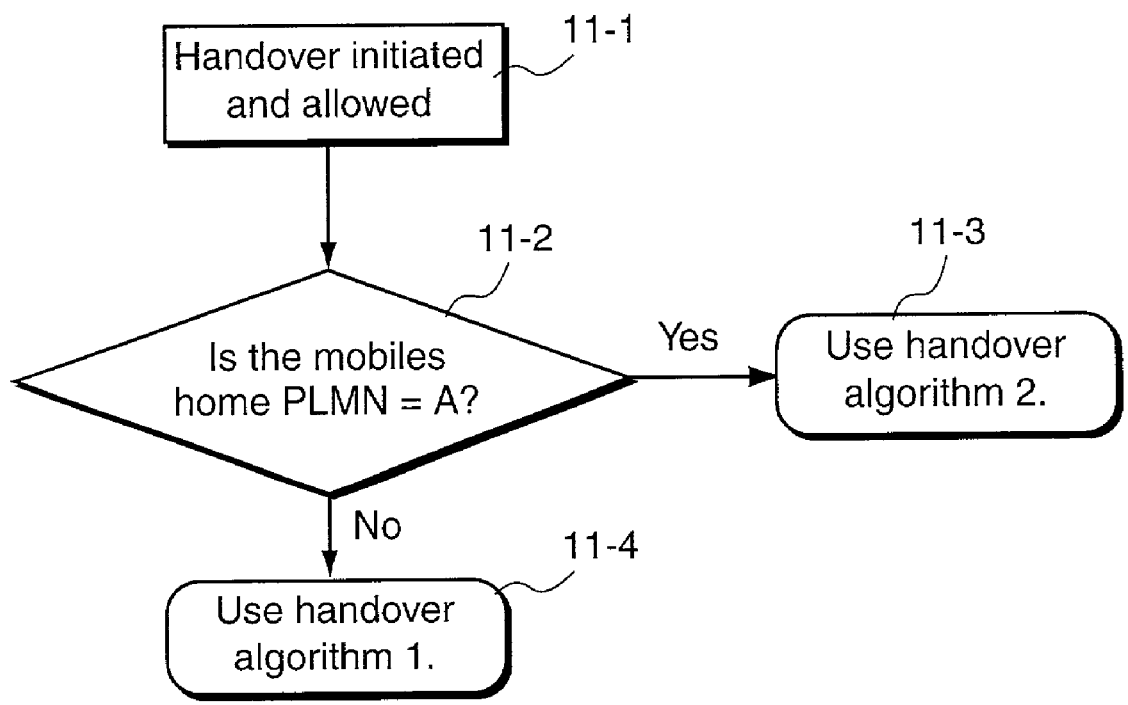
FIG. 11 is a flowchart showing selection of differing handover algorithms in accordance with another example aspect of the present invention.

As illustrated by FIG. 11, the handover algorithm can be different for user equipment units which belong to different PLMNs. FIG. 11 particularly illustrates a situation for a network having a PLMN="B". As step 11-1, a handover is initiated and allowed for a particular user equipment unit. A check is made at step 11-2 whether the home PLMN-id of the user equipment unit is "A". If not, a first handover algorithm is performed as indicated by step 11-4. Otherwise, a second handover algorithm is performed as indicated by step 11-3.

The foregoing illustrates that a reduced sized candidate list can be sent to the user equipment unit and in a way that reduces measurement load for the user equipment unit. This gains significant decrease of signaling in the system, which leads to reduced load in the nodes and in the transport network.

As mentioned above, the invention is not restricted to the use of allowed networks as allowed areas, as other expressions of allowed areas (e.g., location areas, localized service areas, shared network areas) are also within the ambit of the invention. In some instances, existing (e.g., conventional) signaling elements in the signaling between the serving radio network control node and drift radio network control node over the Iur interface may be utilized when transmitting the cell lists (e.g., filtered cell list or neighboring cell list within network identity such as MCC+MNC associated with each neighbor cell) between the nodes. In other instances, the drift radio network control node (DRNC) may need to provide information in addition to the existing signaling elements between the SRNC and DRNC to apprise the SRNC to which area a certain cell belongs. Implementation of such additional signaling can take various forms within the understanding of the person skilled in the art.

Moreover, it should be understood that the neighboring cells of the target cell need not necessarily be WCDMA cells, but can be other technology type cells such as GSM cells, for example. For example, the target cell controlled by the DRNC may have many neighboring GSM cells, but only those neighboring GSM cells which belong to a certain network/area (e.g., MCC+MNC) may be included in the filtered list for a user equipment unit.

There are other alternatives and variations for implementing the invention. Indeed, while the present invention has been described with respect to particular embodiments and alternatives, those skilled in the art will recognize that the present invention is not limited to the specific example embodiments or alternatives described and illustrated herein. Different formats, embodiments, and adaptations besides those shown and described, as well as many modifications, variations, and equivalent arrangements may also be used to implement the invention. While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. For use in a radio access network comprising a serving radio network control node and a drift radio network control node, a method comprising:
    determining that a target cell controlled by the drift radio network control node should be prepared for handover with respect to a user equipment unit, the target cell being neighbored by a set of neighboring cells, the set of neighboring cells including a first subset of neighboring cells and a second subset of neighboring cells, a handover involving the user equipment unit being permitted for a cell of the first subset but not for a cell of the second subset;
    transmitting to the user equipment unit a message including a filtered list of cells, the filtered list of cells including the first subset but not the second subset, the filtered list of cells comprising cells for whose channels the user equinment unit is to perform measurements.

2. The method of claim 1, further comprising:
    determining an allowed area(s) for the user equipment unit;
    preparing the filtered list of cells using the allowed area(s).

3. The method of claim 2, further comprising:
    performing the step of determining the allowed area(s) for the user equipment unit at the drift radio network control node;
    performing the step of preparing the filtered list of cells using the allowed area(s) at the drift radio network control node.

4. The method of claim 3, further comprising:
    transmitting to the drift radio network control node an identification of the target cell and an identification of the user equipment unit; and
    the drift radio network control node transmitting to the serving radio network control node the filtered list.

5. The method of claim 3, wherein the identification of the user equipment unit is the International Mobile Subscriber Identifier (IMSI) of the user equipment unit.

6. The method of claim 4, further comprising:
    transmitting to the drift radio network control node an identification of the target cell and an identification of the user equipment unit in a RADIO LINK SETUP REQUEST message;
    transmitting to the serving radio network control node the filtered list in a RADIO LINK SETUP RESPONSE message.

7. The method of claim 3, further comprising:
    performing the step of determining the allowed area(s) for the user equipment unit at the drift radio network control node by consulting a table maintained at the drift radio network control node.

8. The method of claim 2, further comprising:
performing the step of determining the allowed area(s) for the user equipment unit at the serving radio network control node;
performing the step of preparing the filtered list of cells using the allowed area(s) at the drift radio network control node.

9. The method of claim 8, further comprising:
transmitting to the drift radio network control node an identification of the target cell and a list of allowed area(s) for the user equipment unit; and
the drift radio network control node transmitting to the serving radio network control node the filtered list.

10. The method of claim 9, wherein the list of allowed area(s) comprises a list of allowed network(s) expressed at least partially in terms of PLMN=MCC/MNC.

11. The method of claim 9, further comprising:
transmitting to the drift radio network control node the identification of the target cell and the list of allowed area(s) for the user equipment unit in a RADIO LINK SETUP REQUEST message;
transmitting to the serving radio network control node the filtered list in a RADIO LINK SETUP RESPONSE message.

12. The method of claim 8, further comprising:
performing the step of determining the list of allowed area(s) for the user equipment unit at the serving radio network control node by consulting a table maintained at the serving radio network control node.

13. The method of claim 2, further comprising:
performing the step of determining the allowed area(s) for the user equipment unit at the serving radio network control node;
performing the step of preparing the filtered list of cells using the allowed area(s) at the serving radio network control node.

14. The method of claim 13, further comprising:
transmitting to the drift radio network control node an identification of the target cell for the user equipment unit; and
the drift radio network control node transmitting to the serving radio network control node a list of neighboring cells for the target cell.

15. The method of claim 14, further comprising:
transmitting to the drift radio network control node the identification of the target cell in a RADIO LINK SETUP REQUEST message;
transmitting to the serving radio network control node the list of neighboring cells for the target cell in a RADIO LINK SETUP RESPONSE message.

16. The method of claim 13, further comprising:
performing the step of determining the allowed area(s) for the user equipment unit at the serving radio network control node by consulting a table maintained at the serving radio network control node.

17. The method of claim 2, further comprising:
performing the step of determining the allowed area(s) for the user equipment unit at a core network;
performing the step of preparing the filtered list of cells using the allowed area(s) at the drift radio network control node.

18. The method of claim 17, further comprising determining the list of allowed area(s) for the user equipment unit by consulting a table maintained at a core network node.

19. The method of claim 17, wherein the step of determining the allowed area(s) for the user equipment unit at a core network involves consulting a record in a home location register (HLR) for the user equipment unit.

20. The method of claim 17, further comprising:
transmitting to the drift radio network control node an identification of the target cell and a list of allowed area(s) for the user equipment unit; and
the drift radio network control node transmitting to the serving radio network control node the filtered list.

21. The method of claim 20, wherein the list of allowed area(s) comprises a list of allowed network(s) expressed at least partially in terms of PLMN=MCC/MNC.

22. The method of claim 20, further comprising:
transmitting to the drift radio network control node the identification of the target cell and the list of allowed area(s) for the user equipment unit in a RADIO LINK SETUP REQUEST message;
transmitting to the serving radio network control node the filtered list in a RADIO LINK SETUP RESPONSE message.

23. The method of claim 2, further comprising:
performing the step of determining the allowed area(s) for the user equipment unit at a core network;
performing the step of preparing the filtered list of cells using the allowed area(s) at the serving radio network control node.

24. The method of claim 23, further comprising determining the list of allowed area(s) for the user equipment unit by consulting a table maintained at a core network node.

25. The method of claim 23, wherein the step of determining the allowed area(s) for the user equipment unit at a core network involves consulting a record in a home location register (HLR) for the user equipment unit.

26. The method of claim 23, further comprising:
transmitting to the drift radio network control node an identification of the target cell for the user equipment unit; and
the drift radio network control node transmitting to the serving radio network control node a list of neighboring cells for the target cell.

27. The method of claim 26, further comprising:
transmitting to the drift radio network control node the identification of the target cell in a RADIO LINK SETUP REQUEST message;
transmitting to the serving radio network control node the list of neighboring cells for the target cell in a RADIO LINK SETUP RESPONSE message.

28. The method of claim 1, wherein the serving radio network control node determines that the target cell controlled by the drift radio network control node should be prepared for handover with respect to the user equipment unit, and wherein the serving radio network control node transmits to the user equipment unit the message including the filtered list of cells.

29. The method of claim 1, further comprising transmitting to the user equipment unit the filtered list of cells in a MEASUREMENT CONROL message.

30. A radio access network comprising a serving radio network control node and a drift radio network control node, wherein the serving radio network control node determines that a target cell controlled by the drift radio network control node should be prepared for handover with respect to a user equipment unit, the target cell being neighbored by a set of neighboring cells, the set of neighboring cells including a first subset of neighboring cells and a second subset of neighboring cells, a handover involving the user equipment unit being permitted for a cell of the first subset but not for a cell of the second subset; characterized in that:

the serving radio network control node transmits to the user equipment unit a message including a filtered list of cells, the filtered list of cells including the first subset but not the second subset, the filtered list of cells comprising cells for whose channels the user equipment unit is to perform measurements.

31. The apparatus of claim 30, wherein the drift radio network control node determines allowed area(s) for the user equipment unit at the drift radio network control node and prepares the filtered list of cells using the allowed area(s) at the drift radio network control node.

32. The apparatus of claim 31, wherein the serving radio network control node transmits to the drift radio network control node an identification of the target cell and an identification of the user equipment unit; and wherein the drift radio network control node transmits to the serving radio network control node the filtered list.

33. The apparatus of claim 32, wherein the identification of the user equipment unit is the International Mobile Subscriber Identifier (IMSI) of the user equipment unit.

34. The apparatus of claim 32, wherein the serving radio network control node transmits to the drift radio network control node an identification of the target cell and an identification of the user equipment unit in a RADIO LINK SETUP REQUEST message; and wherein the drift radio network control node transmits to the serving radio network control node the filtered list in a RADIO LINK SETUP RESPONSE message.

35. The apparatus of claim 31, wherein the drift radio network control node determines the allowed area(s) for the user equipment unit by consulting a table maintained at the drift radio network control node.

36. The apparatus of claim 30, wherein the serving radio network control node determines allowed area(s) for the user equipment unit at the serving radio network control node and the drift radio network control node prepares the filtered list of cells using the allowed area(s).

37. The apparatus of claim 36, wherein the serving radio network control node transmits to the drift radio network control node an identification of the target cell and a list of allowed area(s) for the user equipment unit; and wherein the drift radio network control node transmits to the serving radio network control node the filtered list.

38. The apparatus of claim 37, wherein the list of allowed area(s) comprises a list of allowed network(s) expressed at least partially in terms of PLMN=MCC/MNC.

39. The apparatus of claim 37, wherein the serving radio network control node transmits to the drift radio network control node the identification of the target cell and the list of allowed area(s) for the user equipment unit in a RADIO LINK SETUP REQUEST message, and wherein the drift radio network control node transmits to the serving radio network control node the filtered list in a RADIO LINK SETUP RESPONSE message.

40. The apparatus of claim 36, wherein the serving radio network control node determines a list of allowed area(s) for the user equipment unit at the serving radio network control node by consulting a table maintained at the serving radio network control node.

41. The apparatus of claim 30, wherein the serving radio network control node determines allowed area(s) for the user equipment unit and prepares the filtered list of cells using the allowed area(s).

42. The apparatus of claim 41, wherein the serving radio network control node transmits to the drift radio network control node an identification of the target cell for the user equipment unit; and wherein the drift radio network control node transmits to the serving radio network control node a list of neighboring cells for the target cell.

43. The apparatus of claim 42, wherein the serving radio network control node transmits to the drift radio network control node the identification of the target cell in a RADIO LINK SETUP REQUEST message; and wherein the drift radio network control node transmits to the serving radio network control node the list of neighboring cells for the target cell in a RADIO LINK SETUP RESPONSE message.

44. The apparatus of claim 41, wherein the serving radio network control node determines the allowed area(s) for the user equipment unit by consulting a table maintained at the serving radio network control node.

45. The apparatus of claim 30, wherein the serving radio network control node receives from a core network a determination of allowed area(s) for the user equipment unit at a core network; and wherein the drift radio network control node prepares the filtered list of cells using the allowed area(s).

46. The apparatus of claim 45, wherein the core network determines the list of allowed area(s) for the user equipment unit by consulting a table maintained at a core network node.

47. The apparatus of claim 45, wherein the core network determines the allowed area(s) for the user equipment unit by consulting a record in a home location register (HLR) for the user equipment unit.

48. The apparatus of claim 45, wherein the serving radio network control node transmits to the drift radio network control node an identification of the target cell and a list of allowed area(s) for the user equipment unit; and wherein the drift radio network control node transmits to the serving radio network control node the filtered list.

49. The apparatus of claim 48, wherein the list of allowed area(s) comprises a list of allowed network(s) expressed at least partially in terms of PLMN=MCC/MNC.

50. The apparatus of claim 48, wherein the serving radio network control node transmits to the drift radio network control node the identification of the target cell and the list of allowed area(s) for the user equipment unit in a RADIO LINK SETUP REQUEST message; and wherein the drift radio network control node transmits to the serving radio network control node the filtered list in a RADIO LINK SETUP RESPONSE message.

51. The apparatus of claim 30, wherein the serving radio network control node receives from a core network node a determination of allowed area(s) for the user equipment unit; and wherein the serving radio network control node prepares the filtered list of cells using the allowed area(s).

52. The apparatus of claim 51, wherein the core network makes the determination of the list of allowed area(s) for the user equipment unit by consulting a table maintained at a care network node.

53. The apparatus of claim 51, wherein the core network makes the determination of the list of allowed area(s) for the user equipment unit by consulting a record in a home location register (HLR) for the user equipment unit.

54. The apparatus of claim 51, wherein the serving radio network control node transmits to the drift radio network control node an identification of the target cell for the user equipment unit; and wherein the drift radio network control node transmits to the serving radio network control node a list of neighboring cells for the target cell.

55. The apparatus of claim 54, wherein the serving radio network control node transmits to the drift radio network control node the identification of the target cell in a RADIO LINK SETUP REQUEST message; and wherein the drift radio network control node transmits to the serving radio network control node the list of neighboring cells for the target cell in a RADIO LINK SETUP RESPONSE message.

56. The apparatus of claim 30, wherein the serving radio network control node determines that the target cell controlled by the drift radio network control node should be prepared for handover with respect to the user equipment unit, and wherein the serving radio network control node transmits to the user equipment unit the message including the filtered list of cells.

57. A radio network control node capable of acting as a serving radio network control node and capable of communicating with a drift radio network control node, the radio network control node, when having knowledge that a target cell controlled by the drift radio network control node is to be prepared for handover with respect to a user equipment unit and having knowledge of a set of neighboring cells which neighbor the target cell, being arranged for preparing and transmitting to the user equipment unit a message including a filtered list of cells, the filtered list including a first subset of neighboring cells for which the handover involving the user equipment unit is permitted but not including a second subset of neighboring cells for which the handover involving the user equipment unit is not permitted, the filtered list of cells comprising cells for whose channels the user equipment unit is to perform measurements.

58. The apparatus of claim 57, wherein the serving radio network control node determines allowed area(s) for the user equipment unit and prepares the filtered list of cells using the allowed area(s).

59. The apparatus of claim 58, wherein the serving radio network control node transmits to the drift radio network control node an identification of the target cell for the user equipment unit; and wherein the drift radio network control node transmits to the serving radio network control node a list of neighboring cells for the target cell.

60. The apparatus of claim 59, wherein the serving radio network control node transmits to the drift radio network control node the identification of the target cell in a RADIO LINK SETUP REQUEST message; and wherein the drift radio network control node transmits to the serving radio network control node the list of neighboring cells for the target cell in a RADIO LINK SETUP RESPONSE message.

61. The apparatus of claim 58, wherein the serving radio network control node determines the allowed area(s) for the user equipment unit by consulting a table maintained at the serving radio network control node.

62. The apparatus of claim 57, wherein the serving radio network control node receives from a core network node a determination of allowed area(s) for the user equipment unit; and wherein the serving radio network control node prepares the filtered list of cells using The allowed area(s).

63. The apparatus of claim 57, wherein The core network makes the determination of the list of allowed area(s) for the user equipment unit by consulting a table maintained at a core network node.

64. The apparatus of claim 57, wherein the serving radio network control node determines that the target cell controlled by the drift radio network control node should be prepared for handover with respect to the user equipment unit, and wherein the serving radio network control node transmits to the user equipment unit the message including the filtered list of cells.

65. The apparatus of claim 57, wherein the radio network control node transmits the filtered list to the user equipment unit.

\* \* \* \* \*